US012412541B2

(12) United States Patent
Goto

(10) Patent No.: US 12,412,541 B2
(45) Date of Patent: Sep. 9, 2025

(54) IMAGE PROCESSING DEVICE, DISPLAY DEVICE, AND CONTROL METHOD OF IMAGE PROCESSING DEVICE

(71) Applicant: SHARP KABUSHIKI KAISHA, Sakai (JP)

(72) Inventor: Naoko Goto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/615,487

(22) Filed: Mar. 25, 2024

(65) Prior Publication Data

US 2024/0379072 A1 Nov. 14, 2024

(30) Foreign Application Priority Data

May 11, 2023 (JP) ................................. 2023-078370

(51) Int. Cl.
*G09G 3/36* (2006.01)
*G09G 3/34* (2006.01)

(52) U.S. Cl.
CPC ............ *G09G 3/36* (2013.01); *G09G 3/3426* (2013.01); *G09G 2300/023* (2013.01); *G09G 2320/0247* (2013.01); *G09G 2340/00* (2013.01); *G09G 2360/16* (2013.01)

(58) Field of Classification Search
CPC ........... G09G 2300/023; G09G 3/3406; G09G 3/3648; G09G 3/36; G09G 3/3611; G09G 3/3426; G09G 3/3607; G09G 3/003; G09G 3/342; G09G 2320/0646; G09G 2360/16; G09G 2320/0233; G09G 3/3413; G09G 2320/0626; G09G 2320/066; G09G 2320/0247; G09G 2300/0452; G09G 2300/0465; G09G 2320/0257; G02F 1/133528; G02F 1/133308; G02F 1/133615; G02F 1/133514; G02F 1/133342; G02F 1/1347; G02F 1/133504
See application file for complete search history.

(56) References Cited

U.S. PATENT DOCUMENTS

2009/0051707 A1 2/2009 Hirata et al.
2011/0279749 A1* 11/2011 Erinjippurath ....... H04N 13/324 345/32
2021/0201836 A1* 7/2021 Nakanishi ............ G09G 3/3648
2021/0341795 A1* 11/2021 Wang ................ G02F 1/133531
2021/0358426 A1* 11/2021 Lee ...................... G09G 3/3406
2023/0251536 A1* 8/2023 Ikeno ................ G02F 1/133512 349/33

FOREIGN PATENT DOCUMENTS

WO 2007/040139 A1 4/2007

* cited by examiner

*Primary Examiner* — Sujit Shah
(74) *Attorney, Agent, or Firm* — ScienBiziP, P.C.

(57) ABSTRACT

In an image processing device, a first data generation unit generates first data for a first cell based on input luminance of a plurality of first pixels specified by input image data and input luminance and positions of a plurality of second pixels specified by the input image data.

18 Claims, 35 Drawing Sheets

5X5 FILTER (UNCORRECTED)

| | | | | |
|---|---|---|---|---|
| 0.003906 | 0.015625 | 0.023438 | 0.015625 | 0.003906 |
| 0.015625 | 0.0625 | 0.09375 | 0.0625 | 0.015625 |
| 0.023438 | 0.09375 | 0.140625 | 0.09375 | 0.023438 |
| 0.015625 | 0.0625 | 0.09375 | 0.0625 | 0.015625 |
| 0.003906 | 0.015625 | 0.023438 | 0.015625 | 0.003906 |

FIG. 22

LUMINANCE CENTER OF GRAVITY

| | |
|---|---|
| X(H) | 2.5 |
| Y(V) | 2 |

FIG. 23

CONSTANT C 0.0005

FIG. 24

CORRECTION FACTORS OF FILTER COEFFICIENTS

| | |
|---|---|
| Rh+ | 0.00125 |
| Rh− | −0.00125 |
| Rv+ | 0.001 |
| Rv− | −0.001 |

FIG. 25

POST-CORRECTION FILTER COEFFICIENTS

| | | | | |
|---|---|---|---|---|
| 0.001656 | 0.013375 | 0.022438 | 0.015875 | 0.004156 |
| 0.013375 | 0.06025 | 0.09275 | 0.06275 | 0.015875 |
| 0.022188 | 0.0925 | 0.140625 | 0.095 | 0.024688 |
| 0.015375 | 0.06225 | 0.09475 | 0.06475 | 0.017875 |
| 0.003656 | 0.015375 | 0.024438 | 0.017875 | 0.006156 |

FIG. 26

IMAGE PROCESSING DEVICE, DISPLAY DEVICE, AND CONTROL METHOD OF IMAGE PROCESSING DEVICE

CROSS-REFERENCE TO RELATED APPLICATIONS

This application claims the benefit of priority to Japanese Patent Application Number 2023-078370 filed on May 11, 2023. The entire contents of the above-identified application are hereby incorporated by reference.

BACKGROUND

Technical Field

The disclosure relates to an image processing device, a display device, and a control method of an image processing device.

In recent years, as disclosed in WO 2007/040139, an image processing device has been developed in which an image is displayed on a display panel unit obtained by overlapping two liquid crystal display panels having different resolutions to each other. The display panel unit includes a backlight including a plurality of light-emitting elements, a first panel (monocell) including a plurality of cells, and a second panel (main cell or color cell) including a plurality of pixels. The first panel faces the backlight and controls a transmission amount of light at a first resolution. The second panel faces the first panel and controls a transmission amount of light at a second resolution higher than the first resolution.

SUMMARY

According to the technique disclosed in WO 2007/040139, in a region inside a certain cell of the first panel, when an image smaller in size than the certain cell and having extremely higher luminance than peripheral images moves, control for adjusting actual luminance of peripheral cells surrounding the certain cell is not performed. Thus, for example, inconvenience such as occurrence of flicker occurs when the image having the extremely higher luminance than the luminance of the peripheral images crosses a boundary line between the certain cell and the peripheral cells.

The disclosure has been made in view of the problem described above. An object of the disclosure is to provide an image processing device that performs, in a region inside a certain cell, when an image smaller in size than the certain cell and having higher luminance than peripheral images moves, control to adjust luminance of peripheral cells surrounding the certain cell, a display device, and a control method of an image processing device.

(1) An image processing device according to techniques described in the present application is an image processing device for displaying an image on a display panel unit, the display unit including a backlight, a first panel facing the backlight and capable of controlling a transmission amount of light at a first resolution, and a second panel facing the first panel and capable of controlling a transmission amount of light at a second resolution higher than the first resolution, the first panel including a first cell and a plurality of second cells surrounding the first cell, and the second panel including a plurality of first pixels at positions facing the first cell and a plurality of second pixels at positions facing the plurality of second cells, the image processing device including: a first data generation unit configured to generate first data configured to control the first panel based on input image data; and a second data generation unit configured to generate second data configured to control the second panel based on the input image data and the first data, and wherein the first data generation unit generates the first data for the first cell based on input luminance of the plurality of first pixels specified by the input image data and input luminance and positions of the plurality of second pixels specified by the input image data.

(2) In addition to (1), in the image processing device, the first data generation unit may generate the first data so as to suppress occurrence of flicker.

(3) In addition to (1), in the image processing device, the first data generation unit may generate the first data for the first cell based on a distance between a predetermined position inside the first cell and a specific position inside each of the plurality of second pixels and input luminance of the plurality of second pixels.

(4) In addition to (3), in the image processing device, the first data generation unit may generate the first data such that a degree of influence of input luminance of a second pixel having a relatively large distance among the plurality of second pixels on the luminance of the first cell is smaller than a degree of influence of input luminance of a second pixel having a relatively small distance among the plurality of second pixels on the luminance of the first cell.

(5) In addition to (4), in the image processing device, the first data generation unit may generate the first data such that a degree of influence of the input luminance of a second pixel having relatively large input luminance among the plurality of second pixels on the luminance of the first cell is larger than a degree of influence of the input luminance of a second pixel having relatively small input luminance among the plurality of second pixels on the luminance of the first cell.

(6) In addition to (1), in the image processing device, the first data generation unit may include a representative value setting unit configured to set a representative value of each of the plurality of second cells based on input luminance of the plurality of second pixels at positions facing each of the plurality of second cells, a luminance center of gravity calculation unit configured to calculate a luminance center of gravity of each of the plurality of second cells based on the input luminance and the positions of the plurality of second pixels, a filter calculation unit configured to calculate the filter coefficients of the two dimensional filter for the peripheral cells surrounding the center cell so as to include the first cell when one of the plurality of second cells is set as the center cell based on the luminance center of gravity for each of the plurality of second pixels, and a filter processing unit configured to generate the first data for the first cell by performing filter processing on the plurality of peripheral cells by using the coefficients of the two dimensional filter with the representative value as input luminance of the center cell of the two dimensional filter for each of the plurality of second cells.

(7) In addition to (6), in the image processing device, the filter calculation unit may calculate the filter coefficients of the two dimensional filter by performing correction to increase the filter coefficients of the two dimensional filter for the plurality of peripheral cells present on a side of the luminance center of gravity with respect to the representative position of the center cell, and may calculate the filter coefficients of the two dimensional filter by performing correction to decrease the filter coefficients of the two dimensional filter for the plurality of peripheral cells present on an opposite side of the luminance center of gravity with respect to the representative position of the center cell.

(8) In addition to (7), in the image processing device, the filter calculation unit may calculate post-correction filter coefficients of the two dimensional filter by correcting the filter coefficients such that a change amount due to the correction of the filter coefficients increases as a distance between the representative position of the center cell and the luminance center of gravity increases.

(9) In addition to any one of (6) to (8), in the image processing device, the two dimensional filter may be a low pass filter.

(10) In addition to any one of (1) to (9), in the image processing device, the backlight may include a plurality of light-emitting regions capable of adjusting a light emission amount, the image processing device may include a backlight data generation unit configured to generate backlight data for controlling a light emission amount of each of the plurality of light-emitting regions based on the input image data, and a first panel luminance distribution calculation unit configured to calculate a luminance distribution at a position of the second panel with respect to light traveling from the first panel to the second panel based on the backlight data and the first data, and the second data generation unit may generate the second data based on the input image data and the luminance distribution.

(11) In addition to any one of (1) to (10), in the image processing device, in a front view of the display panel unit, a shape of each of the first cell and the plurality of second cells may be different from a shape of each of the plurality of first pixels and the plurality of second pixels.

(12) In addition to any one of (1) to (11), in the image processing device, in a front view of the display panel unit, a part of one cell of the first cell and the plurality of second cells and a part of an adjacent cell adjacent to the one cell may be mixed in a common region.

(13) In addition to any one of (1) to (12), in the image processing device, the first panel may be a liquid crystal panel.

(14) In addition to any one of (1) to (13), in the image processing device, the second panel may be a liquid crystal panel.

(15) A display device according to techniques described in the present application includes the display panel unit and the image processing device according to any one of (1) to (14).

(16) A control method of an image processing device according to techniques described in the present application is a control method of an image processing device for displaying an image on a display panel unit, the display panel unit including a backlight; a first panel facing the backlight and capable of controlling a transmission amount of light at a first resolution; and a second panel facing the first panel and capable of controlling a transmission amount of light at a second resolution higher than the first resolution, the first panel including a first cell and a plurality of second cells surrounding the first cell, the second panel including a plurality of first pixels at positions facing the first cells and a plurality of second pixels at positions facing the plurality of second cells, the control method of the image processing device including: generating first data configured to control the first panel based on input image data; and generating second data configured to control the second panel based on the input image data and the first data, wherein the generating the first data generates the first data for the first cell based on input luminance of the plurality of first pixels specified by the input image data and input luminance and positions of the plurality of second pixels specified by the input image data.

BRIEF DESCRIPTION OF DRAWINGS

The disclosure will be described with reference to the accompanying drawings, wherein like numbers reference like elements.

FIG. 22 is a diagram showing an example of pre-correction filter coefficients of a low pass filter as an example of the two dimensional filter used in the image processing device of the display device according to the second embodiment.

FIG. 23 is a diagram showing an example of coordinates of a luminance center of gravity used in the image processing device of the display device according to the second embodiment.

FIG. 24 is a diagram showing an example of a constant of an operation used in the image processing device of the display device according to the second embodiment.

FIG. 25 is a diagram showing an example of correction factors of the filter coefficients used in the image processing device of the display device according to the second embodiment.

FIG. 26 is a diagram showing an example of post-correction filter coefficients of the two dimensional filter used in the image processing device of the display device according to the second embodiment.

DESCRIPTION OF EMBODIMENTS

Figure 1:
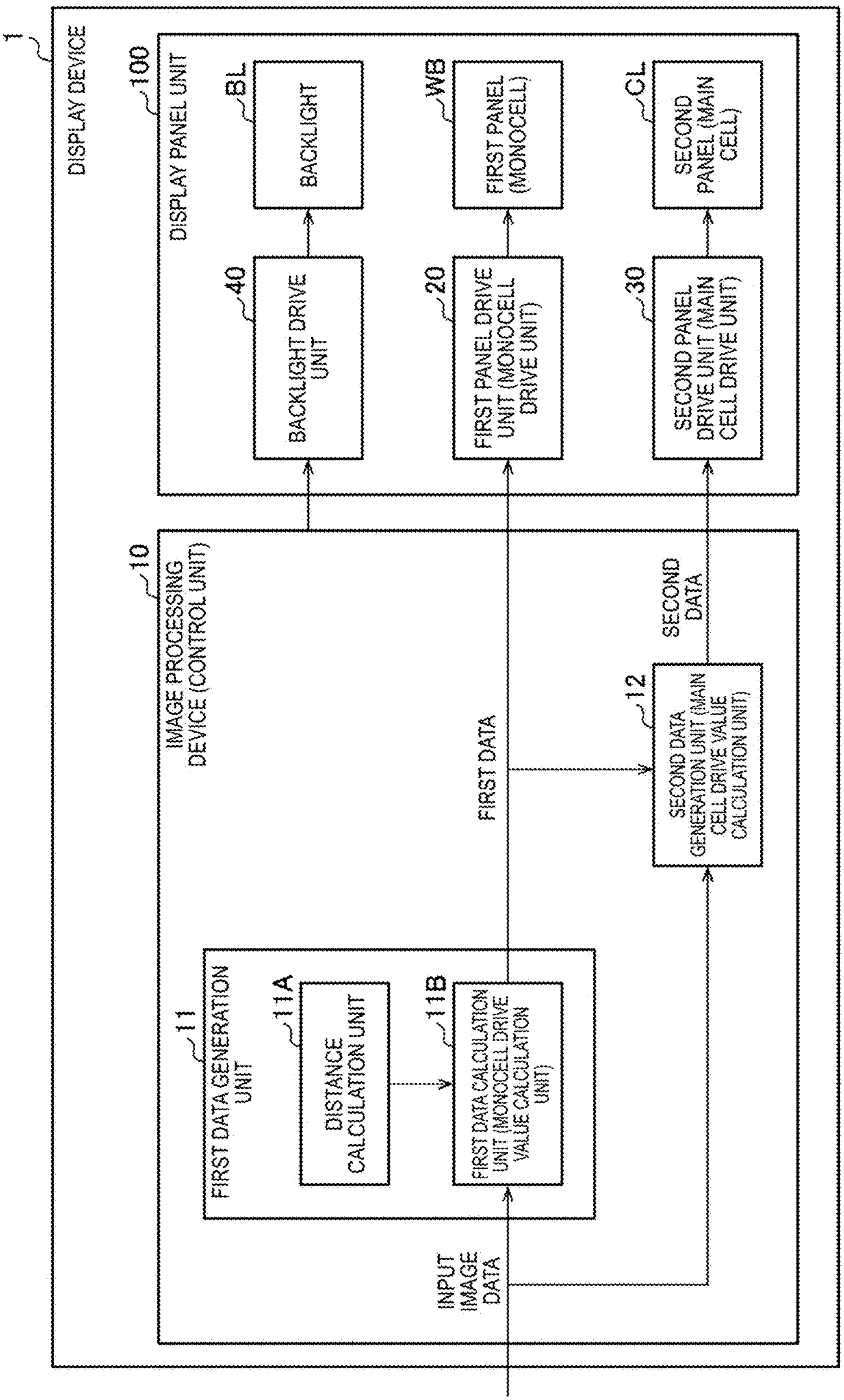
FIG. 1 is a block diagram illustrating an overall configuration of a display device according to a first embodiment.

Hereinafter, an image processing device of embodiments according to the disclosure will be described with reference to the accompanying drawings. Further, in the drawings, the same or equivalent elements are denoted by the same reference numerals and signs, and repeated descriptions thereof will be omitted.

First Embodiment

FIG. 1 is a block diagram illustrating an overall configuration of a display device 1 according to the present embodiment.

The display device 1 includes a display panel unit 100 and an image processing device 10 that controls the display panel unit 100 as illustrated in FIG. 1. In the display device 1 according to the present embodiment, the display panel unit 100 and the image processing device 10 are physically integrated. However, the display panel unit 100 and the image processing device 10 may be physically separated as long as they are communicatively connected to each other.

The display panel unit 100 includes a backlight BL, a backlight drive unit 40, a first panel WB, a first panel drive unit 20, a second panel CL, and a second panel drive unit 30. Each of the first panel WB and the second panel CL is a liquid crystal panel in the present embodiment, but may be a panel other than the liquid crystal panel.

Figure 2:
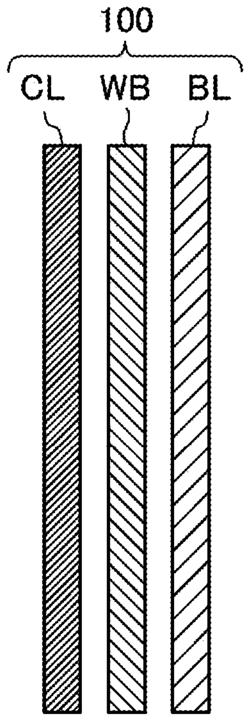
FIG. 2 is a schematic cross-sectional view of a display panel unit of a display device common to each embodiment.

The backlight BL is disposed to face the first panel WB (see FIG. 2). The backlight BL includes a plurality of light-emitting regions LER (see FIG. 3). The resolution of the plurality of light-emitting regions LER constituting the backlight BL is, for example, 6×4. Further, each of the plurality of light-emitting regions LER includes a plurality of light emitting diodes (LEDs).

The plurality of LEDs are controlled such that light emission aspects of the plurality of LEDs in each of the light-emitting regions LER are identical and thus one entire light-emitting region LER emits light uniformly to some extent. Then, local dimming for independently controlling a light emission amount by each of the plurality of light-emitting regions LER may be performed. However, in the description of the present embodiment, the local dimming is not executed.

The backlight drive unit 40 drives each of the plurality of light-emitting regions LER constituting the backlight BL to realize output of each of the plurality of light-emitting regions LER specified with backlight data generated by the image processing device 10.

The first panel WB faces the backlight BL and is a liquid crystal display panel capable of controlling a transmission amount of light at a first resolution. The first panel WB is referred to as a monochrome panel (hereinafter, also referred to as a "monocell") capable of performing black-and-white display (see FIG. 2). The first panel WB includes a plurality of cells CE (see FIG. 4). The first panel WB may be any panel as long as it can control the transmittance of light for each of the plurality of cells CE. The first panel WB may be, for example, a panel using a micro electro mechanical systems (MEMS) shutter.

Each of the plurality of cells CE has no color filter. Each of the plurality of cells CE functions as an opening for adjusting a transmission amount of light emitted by the backlight BL. The area of the opening of the cell CE is variable. The first panel WB is disposed to face the second panel CL (see FIG. 2). The resolution of the plurality of cells CE constituting the first panel WB is, for example, 240×135.

The first panel drive unit (hereinafter, also referred to as a "monocell drive unit") 20 drives a liquid crystal layer of each of the plurality of cells CE constituting the first panel WB so as to realize an aperture ratio of each of the plurality of picture elements PE specified with the data generated by the image processing device 10. Note that in the present specification, the aperture ratio of the cell CE means an actual opening area of the cell CE with respect to a maximum opening area of the cell CE.

The second panel CL (see FIG. 2) faces the first panel WB and is a liquid crystal display panel capable of controlling the transmission amount of light at a second resolution higher than the first resolution of the first panel WB. The second panel CL is referred to as a color panel (hereinafter, also referred to as a "main cell") capable of performing color display. The second panel CL includes a plurality of pixels PX (see FIG. 5).

Each of the plurality of pixels PX includes a plurality of subpixels. In the present specification, a subpixel is referred to as a "picture element PE" (see FIG. 5). Each of the plurality of pixels PX includes a picture element PE(R), a picture element PE(G), and a picture element PE(B). The picture element PE(R) has a red color filter through which red light is transmitted. The picture element PE(G) has a green color filter through which green light is transmitted. The picture element PE(B) has a blue color filter through which blue light is transmitted.

Figure 5:
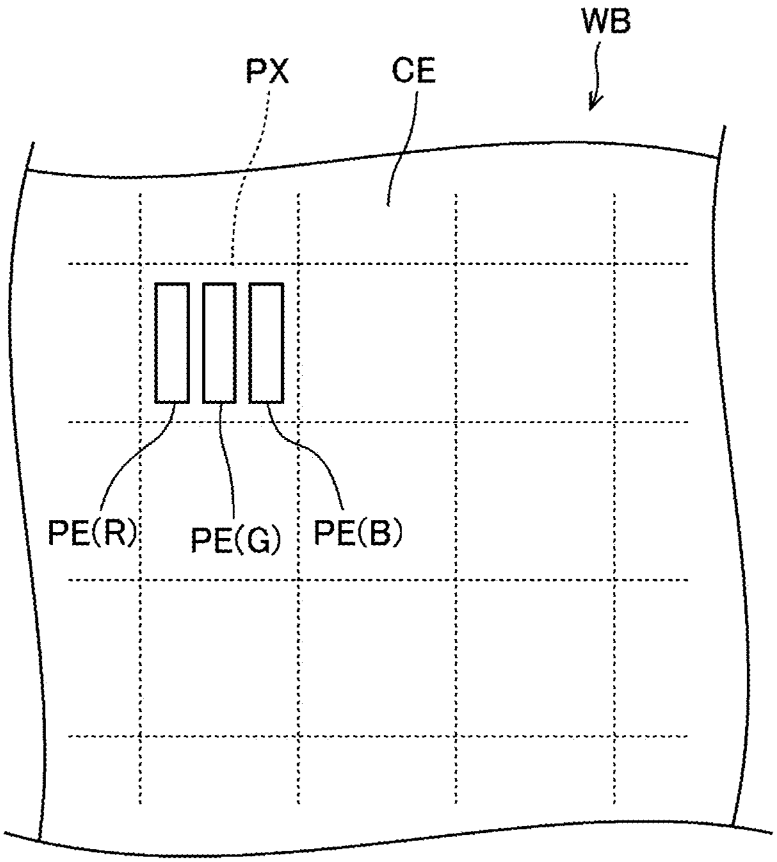
FIG. 5 is a diagram for describing a relationship between the cell of the first panel (monocell) and a pixel of a second panel (main cell) and picture elements included in the pixel of the display device common to each embodiment.

The second panel CL may be any panel other than the liquid crystal display panel as long as it can control the transmittance of light for each of the picture element PE (R), the picture element PE (G), and the picture element PE (B) (see FIG. 5). The second panel CL may be, for example, a panel using a micro electro mechanical systems (MEMS) shutter.

Further, a combination of the color filters of the plurality of picture elements PE constituting one pixel PX of the second panel CL is not limited to the combination of red, green, and blue, and may be, for example, a combination of yellow, magenta, and cyan. The resolution for each color of the plurality of picture elements PE constituting the second panel CL is, for example, 1920×1080. That is, the resolution for the plurality of pixels PX constituting the second panel CL is, for example, 1920×1080.

The second panel drive unit (hereinafter, also referred to as a "main cell drive unit") 30 drives a liquid crystal layer of each of the plurality of picture elements PE constituting the second panel CL so as to realize an aperture ratio of each of the plurality of picture elements PE specified with the data generated by the image processing device 10. Note that in the present specification, the aperture ratio of the picture element PE means an actual aperture area of the picture element PE with respect to a maximum aperture area of the picture element PE.

The image processing device 10 controls the display panel based on a predetermined control method, and causes the display panel unit 100 to display an image based on input image data input from the outside. In the present embodiment, the resolution of the input image data is the same as the resolution of the plurality of pixels PX, which is 1920×1080. The input image data is data with which a plurality of input gray scale values each input to the plurality of picture elements PE of the second panel CL can be specified.

In addition, the input image data is data with which the input image can be specified with the plurality of input gray scale values. The input image specified with the input image data corresponds to an output image displayed on the display panel unit 100. When the resolution of the input image data is different from the resolution of the plurality of pixels PX, for example, a resolution conversion unit that converts the resolution of the input image data into the resolution of the plurality of picture elements PE may be provided before the first data generation unit 11.

The image processing device 10 includes the first data generation unit 11 and a second data generation unit 12 (hereinafter also referred to as a "main cell drive value calculation unit"). In the present embodiment, each of the first data generation unit 11 and the second data generation unit 12 is realized by at least a part of the function of a processor. However, at least one of the first data generation unit 11 and the second data generation unit 12 may be configured by an electronic circuit dedicated to image processing according to the present embodiment.

The input image data is transmitted from the outside of the display device 1 to the image processing device 10. The input image data, that is, an input gray scale value of each of the plurality of picture elements PE constituting the second panel CL, is transmitted to each of the first data generation unit 11 and the second data generation unit 12 inside the image processing device 10.

The first data generation unit 11 generates the first data for controlling the aperture ratios of the plurality of cells CE based on the input image data. The first data is, for example, data corresponding to a resolution of 240×135 that is the resolution of the first panel WB. The first data generation unit 11 uses the input image data to generate the aperture ratio of each of the plurality of cells CE constituting the first panel WB.

The second data generation unit 12 generates the second data for controlling the aperture ratios of the plurality of pixels PX based on the input image data and the first data. The second data is, for example, data corresponding to a resolution of 1920×1080 that is the resolution of the second panel CL. The second data generation unit 12 uses the input image data and the first data to generate the aperture ratio of each of the plurality of pixels PX constituting the second panel CL.

First, the second data generation unit 12 uses the first data (drive value of the cell CE) to calculate luminance distribution of light passing through the cells CE from the backlight BL and reaching the pixels PX. That is, the second data generation unit 12 calculates luminance distribution at a position of the main cell, that is, the second panel CL. Thereafter, the second data generation unit 12 corrects the input image data by using the calculated luminance distribution so as to compensate for the lack of luminance caused by adjusting the amount of light traveling from the backlight BL to each picture element PE by controlling the aperture ratio of each cell CE of the first panel. Thereby, the second data (drive value of the pixel PX) is generated.

FIG. 2 is a schematic cross-sectional view of the display panel unit 100 of the display device 1 common to each embodiment. As illustrated in FIG. 2, in the display panel unit 100, the backlight BL, the first panel WB, and the second panel CL are arranged in this order. The backlight BL and the first panel WB are disposed to face each other. The first panel WB and the second panel CL are also disposed to face each other.

Figure 3:
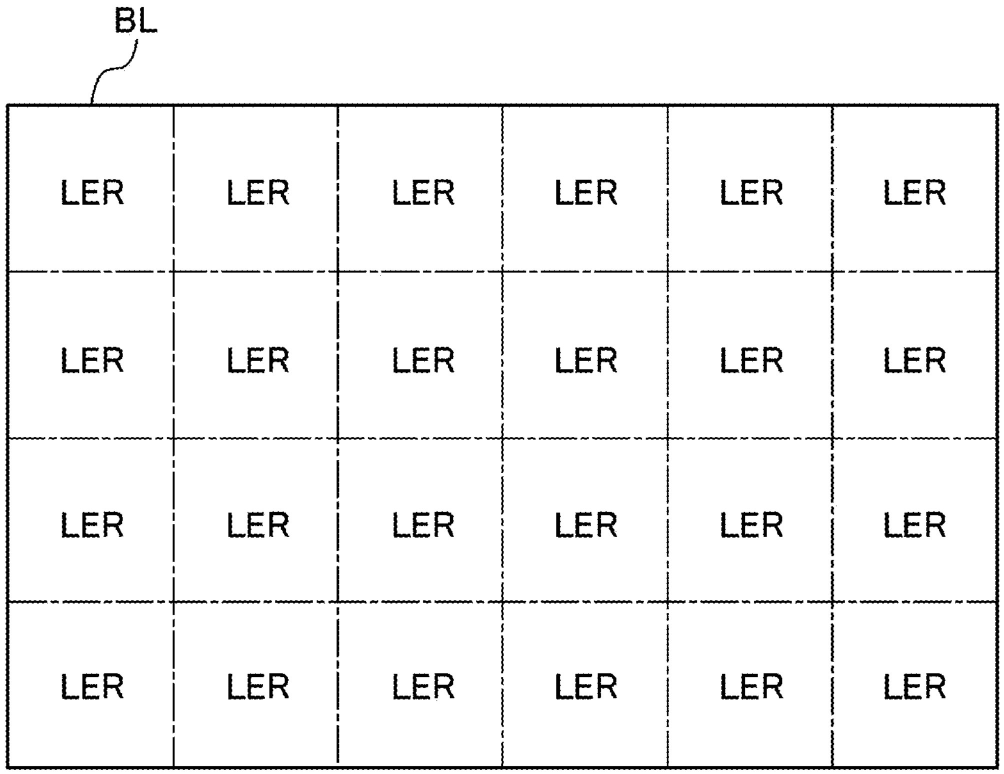
FIG. 3 is a plan view of a plurality of light-emitting regions of a backlight of the display device common to each embodiment.

FIG. 3 is a plan view of a plurality of light-emitting regions LER of the backlight BL of the display device 1 common to each embodiment. As illustrated in FIG. 3, the backlight BL is divided into the plurality of light-emitting regions LER, specifically, into, for example, 24 (=6×4) light-emitting regions LER. The image processing device 10 independently controls the output of each of the plurality of light-emitting regions LER. A plurality of LEDs in each of the plurality of light-emitting regions LER are controlled in an identical light emission mode.

However, in the present embodiment, the plurality of light-emitting regions LER are controlled so that all the plurality of light-emitting regions LER have the same luminance. That is, the image processing device 10 and the backlight BL have capability of performing the local dimming, but do not perform the local dimming in the present embodiment. Note that the image processing device 10 and the backlight BL according to the present embodiment need not have the capability of performing the local dimming.

Figure 4:
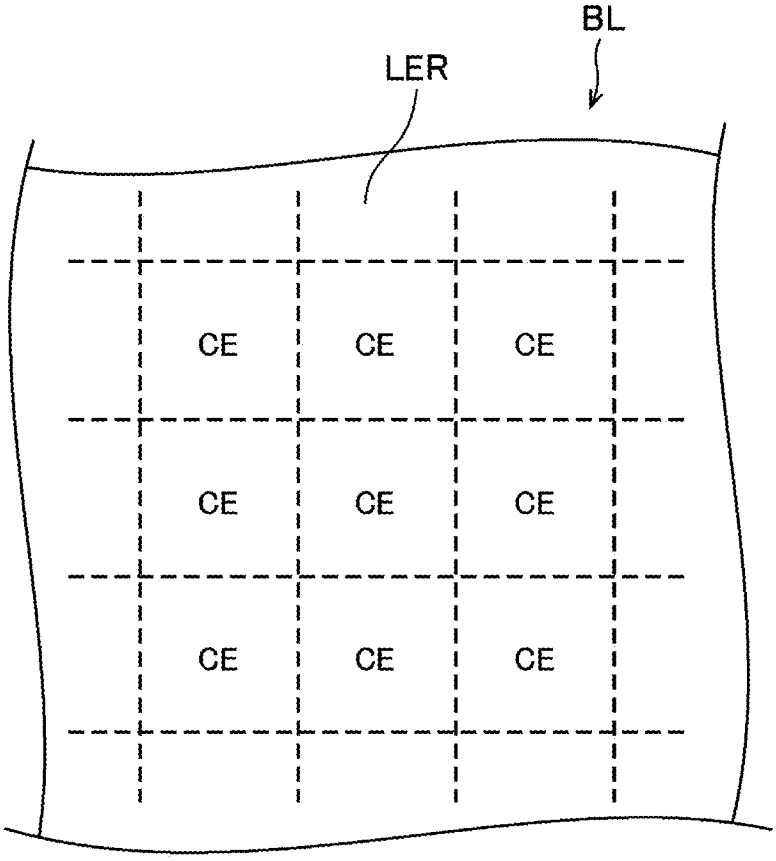
FIG. 4 is a diagram for describing a relationship between the light-emitting region of the backlight and cells of a first panel (monocell) of the display device common to each embodiment.

FIG. 4 is a diagram for describing a relationship between the light-emitting region LER of the backlight BL of the display device 1 common to each embodiment and the cells CE of the first panel (monocell) WB. As can be seen from FIG. 4, there are several cells CE in one virtual region facing each of the plurality of light-emitting regions LER.

FIG. 5 is a diagram for describing a relationship between the cell CE of the first panel (monocell) WB and the pixels PX and picture elements PE of the second panel (main cell) CL of the display device 1 common to each embodiment. As can be seen from FIG. 5, several pixels PX are included in one virtual region facing each of the plurality of cells CE, and each of the several pixels PX includes three picture elements PE. That is, several picture elements PE are included in the one virtual region facing each of the plurality of cells CE.

As can be seen from a comparison between FIGS. 3 to 5, the resolutions of the plurality of light-emitting regions LER of the backlight BL, the plurality of cells CE of the first panel WB, and the plurality of pixels PX and the plurality of picture elements PE of the second panel CL increase in this order.

Each of the light-emitting regions LER of the backlight BL is controlled by the image processing device 10 so as to realize the luminance at the maximum value of the input gray scale values of several picture elements PE in one virtual region facing the light-emitting regions LER that can be specified with the input image data, for example.

However, in the present embodiment, the image processing device 10 controls all the plurality of light-emitting regions LER of the backlight BL to emit light at the same luminance. That is, the local dimming is not performed. In other words, in the present embodiment, a light emission amount of each of the plurality of light-emitting regions LER of the backlight BL specified by the input image data is the same.

Each of the cells CE of the first panel WB is controlled by the image processing device 10 so as to realize the luminance having the maximum value of the input gray scale values of several picture elements PE in one virtual region facing the cell CE that can be specified with the input image data, for example. The second panel CL is controlled by the image processing device 10 so as to realize luminance of each of the plurality of picture elements PE that can be specified with the input image data.

Figure 6:
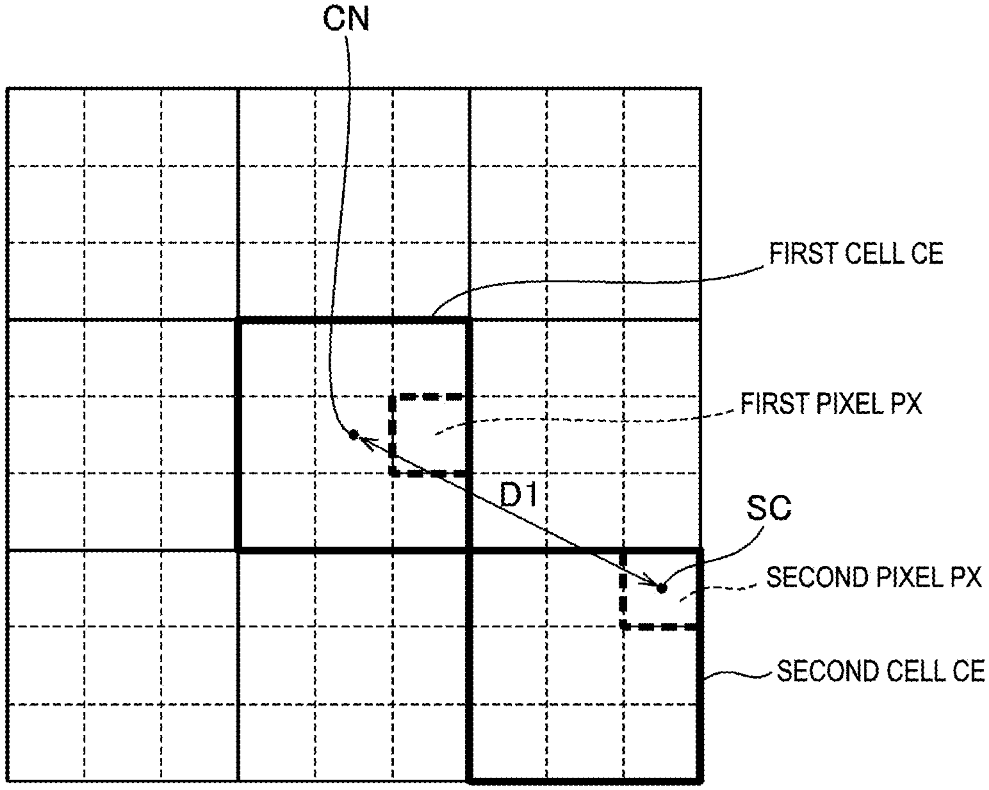
FIG. 6 is a diagram for describing a first cell, a plurality of first pixels included in the first cell, a plurality of second cells, and a plurality of second pixels included in the second cell when the first panel and the second panel of the display device according to a first embodiment are seen through from the front.

FIG. 6 is a diagram for describing a first cell CE, a plurality of first pixels PX included in the first cell CE, a plurality of second cells CE, and a plurality of second pixels PX included in the second cell CE when the first panel WB and the second panel CL of the display device 1 according to the present embodiment are seen through from the front.

As illustrated in FIG. 6, the first panel WB includes the first cell CE disposed at a center position of a matrix formed of m×n cells CE (m and n are natural numbers and at least one of m and n is 2 or more), (or at a position near the center of the matrix. Hereinafter, both are referred to as the center position of the matrix), and the plurality of second cells CE disposed in peripheries of the first cell CE so as to surround the first cell CE. The first cell CE is, for example, one center cell CE located at the center of the 3×3 matrix, and the second cells CE are cells CE at eight peripheral positions surrounding the cell CE at the center position. However, the arrangement of the first cell CE and the second cells CE is not limited to the 3×3 matrix disclosed in FIG. 6 as long as the relationship between the center position and the peripheral positions surrounding the center position is satisfied.

When the first panel WB includes k cells CE, the image processing device 10 performs processing for a case where each of the k cells CE serves as the first cell CE. Thus, a certain cell CE may serve as the first cell CE or the second cell CE. In addition, when the cell CE located at an end portion of the first panel WB serves as the first cell, the first cell CE may not be able to be disposed at the center position of the matrix.

The second panel CL includes the plurality of first pixels PX at a position facing the first cell CE and the plurality of second pixels PX at a position facing each of the plurality of second cells CE. That is, one cell CE at the center position of one set of cells CE formed of the 3×3 matrix faces the plurality of first pixels PX, and each of the eight cells CE at peripheral positions surrounding the cell CE at the center position faces the plurality of second pixels PX.

In FIG. 6, each of the plurality of first pixels PX and the plurality of second pixels PX are included in a region facing the one cell CE. However, some of the plurality of first pixels PX or some of the plurality of second pixels PX may be disposed across the region facing two cells CE.

The first data generation unit 11 generates the first data for controlling the first panel WB based on the input image data. The first data generation unit 11 includes a distance calculation unit 11A and a first data calculation unit 11B. Details of each of the distance calculation unit 11A and the first data calculation unit (hereinafter also referred to as a "monocell drive value calculation unit") 11B will be described later.

The first data generation unit 11 generates first data for the first cell CE based on the input luminance of the plurality of first pixels PX specified by the input image data and the input luminance and positions of the plurality of second pixels PX specified by the input image data.

Specifically, the distance calculation unit 11A calculates a distance D1 between a specific position of each pixel PX and a predetermined position of the cell CE. At this time, the distance calculation unit 11A calculates the distance D1 based on the cell CE and the pixel PX of the second panel (main cell) CL, which are used for the distance calculation. A point serving as a reference of the cell CE is a center position of the cell, specifically, an intersection point of diagonal lines of a rectangle.

When the processing of calculating the distance D1 is performed with the pixel PX as the reference, the cells CE used for the calculation of the distance D1 for a certain pixel PX desirably include all the cells CE included in the first panel WB. However, from the viewpoint of suppressing an increase in time and processing for the calculation of the distance D1, the cells CE used for the calculation of the distance D1 for the certain pixel PX may be limited to the cells CE in a predetermined region in the first panel WB, including some of the cells CE of all the cells CE.

On the other hand, when the processing of calculating the distance D1 is performed with the cell CE as the reference, the pixels PX used to calculate the distance D1 for a certain cell CE desirably include all the pixels PX included in the second panel CL. However, from the viewpoint of suppressing an increase in time and processing for the calculation of the distance D1, the pixels PX used for the calculation of the distance DI for the certain cell CE may be limited to the pixels PX in a predetermined region in the second panel CL including some of the pixels PX of all the pixels PX.

The first data calculation unit (monocell drive value calculation unit) 11B calculates a drive value of the cell CE according to the distance D1. As a method of this calculation, for example, the following method is conceivable. When the distance between the specific position of the certain pixel PX and the center position of the cell CE is D1, it is assumed that the drive value=(k/d)×(gray scale value (luminance) of the certain pixel PX) or the drive value=(k/d^2)×(gray scale value (luminance) of the certain pixel PX).

However, when the certain pixel PX is included in a region facing the certain cell CE, it is assumed that the drive value=the gray scale value (luminance) of the certain pixel PX. In addition, it is assumed that the value of the constant k can be changed by a mechanism (such as a register) that can be changed from the outside.

Since the plurality of pixels PX are present as calculation targets of the drive values for one cell CE, the first data calculation unit (monocell drive value calculation unit) 11B calculates a plurality of the drive values for the one cell CE. The first data calculation unit (monocell drive value calculation unit) 11B sets the largest value among the plurality of drive values as the drive value of the one cell CE.

According to this, in a region inside the one cell CE, when an image smaller in size than the one cell CE and having higher luminance than peripheral images moves, control for adjusting the luminance of a plurality of peripheral cells CE surrounding the one cell CE can be performed.

In the present embodiment, the first data generation unit 11 generates the first data so as to suppress occurrence of flicker. Thus, in the region inside the one cell CE, when the image smaller in size than the one cell CE and having the extremely higher luminance than peripheral images moves, the occurrence of flicker can be suppressed.

Specifically, the first data generation unit 11 generates the first data for the first cell CE based on the distance D1 between a predetermined position (CN) inside the first cell CE and a specific position SC (center position) inside each of the plurality of second pixels PX and input luminance of the plurality of second pixels PX. In the present embodiment, the predetermined position inside the first cell CE is an intersection point of diagonal lines of the rectangular cell CE, that is, the center position CN, but is not limited thereto. The specific position SC is an intersection point of diagonal lines of the rectangular second pixel PX, that is, a center position, but is not limited thereto.

According to the first data described above, the following (1) is realized. (1) The degree of influence of the input luminance of the second pixel PX having a relatively large distance D1 among the plurality of second pixels PX on the luminance of the first cell CE is smaller than the degree of influence of the input luminance of the second pixel PX having a relatively small distance D1 among the plurality of second pixels PX on the luminance of the first cell CE.

Further, according to the first data, the following (2) is realized. (2) The degree of influence of the input luminance of the second pixel PX having relatively large input luminance among the plurality of second pixels PX on the luminance of the first cell CE is larger than the degree of influence of the input luminance of the second pixel PX having relatively small input luminance among the plurality of second pixels PX on the luminance of the first cell CE.

Figure 7:
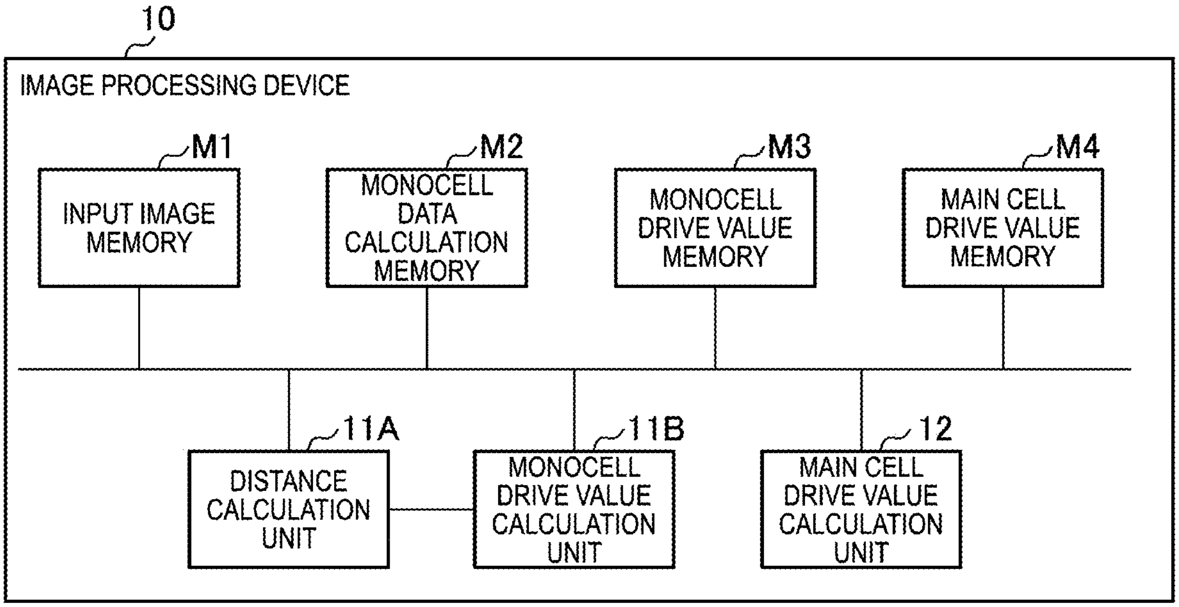
FIG. 7 is a diagram specifically illustrating an internal configuration of a first example of an image processing device according to the first embodiment.

FIG. 7 is a diagram specifically illustrating an internal configuration of a first example of the image processing device 10 according to the present embodiment.

As illustrated in FIG. 7, the image processing device 10 includes an input image memory M1, a monocell data calculation memory M2, a monocell drive memory M3, and a main cell drive value memory M4, which are not illustrated in FIG. 1.

The input image memory M1 is a memory for storing the input image data for one frame. The monocell data calculation memory M2 is a memory for storing calculated values of the monocells for one frame. The monocell drive value memory M3 is a memory for storing the calculated monocell drive values for one frame.

The main cell drive value memory M4 is a memory for storing the calculated main cell drive values for one frame. Each of the input image memory M1, the monocell data calculation memory M2, the monocell drive memory M3, and the main cell drive value memory M4 is initialized to 0 before the start of processing described with reference to the flowchart shown in FIG. 8.

Figure 8:
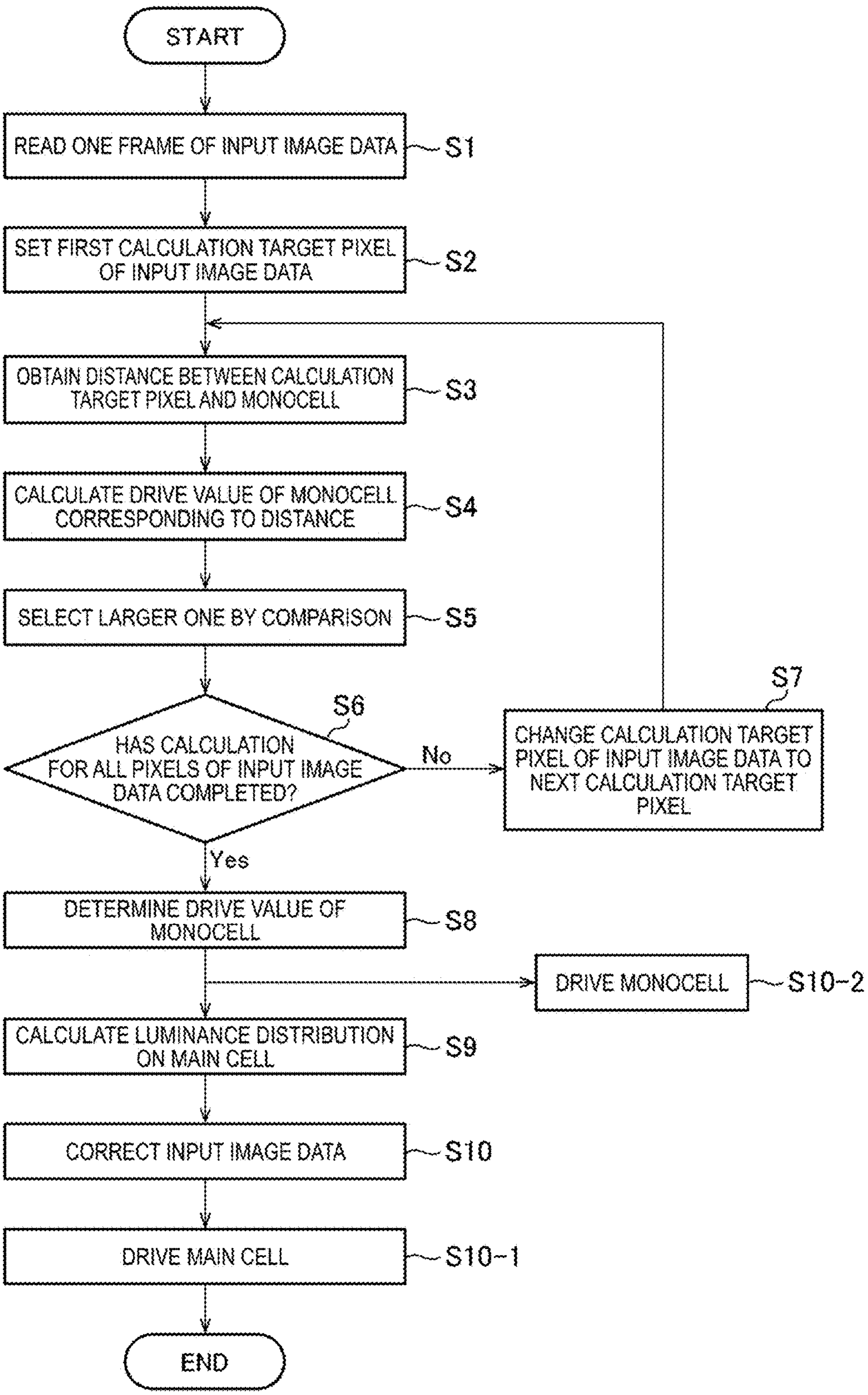
FIG. 8 is a flowchart for describing processing executed by the first example of the image processing device according to the first embodiment.

FIG. 8 is a flowchart for describing processing executed by the first example of the image processing device 10 according to a first embodiment.

In step S1, the image processing device 10 reads the input image data for one frame from an external device. The input image data is stored in the input image memory M1. In step S2, the image processing device 10 sets a pixel PX of a first calculation target of a group of pixels PX included in the input image data. For example, the image processing device 10 sets the leftmost and uppermost pixel PX in the input image data as the first calculation target.

In step S3, the distance calculation unit 11A calculates the distance between the pixel PX of the calculation target and the monocell, specifically, the distance D1 (see FIG. 6) between the specific position SC (center position) of the pixel PX of the calculation target and the predetermined position (center position CN) of the cell CE of the first panel WB. That is, the distance calculation unit 11A calculates the distance D1 between the specific position of one pixel PX of the calculation target and the center position CN of each of the plurality of cells CE related to the specific position. Thus, the distance calculation unit 11A calculates a plurality of the distances D1 for the plurality of cells CE.

At this time, the first data calculation unit 11B calculates the drive value so as to increase the drive value (the value corresponding to the luminance) when the distance D1 is small, and decrease the drive value (the value corresponding to the luminance) when the distance D1 is large.

In step S4, the first data calculation unit (monocell drive value calculation unit) 11B calculates the drive value (value corresponding to luminance of the monocell corresponding to the distance D1) for each of the plurality of monocells (each cell CE of the first panel WB). The plurality of calculated drive values are stored in the monocell data calculation memory M2.

In step S5, the first data calculation unit (monocell drive value calculation unit) 11B compares the following (1) and (2) for each of the plurality of monocells.

(1) A drive value (corresponding to luminance) corresponding to the distance D1 between the specific position SC of the pixel PX of a previous calculation target and the predetermined position (center position CN) of specific one monocell (cell CE of the first panel WB), which is stored in the monocell data calculation memory M2.

(2) A drive value (corresponding to luminance) corresponding to the distance D1 between the specific position SC of the pixel PX of a calculation target this time and the predetermined position (center position CN) of the specific one monocell (cell CE of the first panel WB).

As a result, the first data calculation unit (monocell drive value calculation unit) 11B selects a larger drive value (corresponding to luminance) for each of the plurality of monocells as a result of the comparison between (1) and (2) described above. The selected drive value is overwritten in the monocell data calculation memory M2.

In step S6, the image processing device 10 determines whether the processing in steps S3 to S5 for all the pixels PX included in the input image data has been completed. In step S6, it may not be determined that the processing in steps S3 to S5 for all the pixels PX included in the input image data has been completed. In this case, in step S7, the image processing device 10 changes the pixel PX of the calculation target in the input image data to the next pixel PX, and repeats steps S3 to S6. For example, in step S7, the image processing device 10 sets a pixel PX one pixel to the right of the pixel PX currently set as the calculation target as a pixel PX of a new calculation target. When the pixel PX currently set as the calculation target is the pixel PX at the right end, the image processing device 10 sets a pixel PX at the left end in a row one below the input image data as the pixel PX of the new calculation target.

On the other hand, in step S6, it may be determined that the calculations in steps S3 to S5 for all the pixels PX included in the input image data have been completed. For example, this is a case where the pixel PX currently set as the calculation target is the rightmost and lowermost pixel PX in the input image data. In this case, in step S8, the first data calculation unit (monocell drive value calculation unit) 11B determines the drive value (value corresponding to luminance) of the first panel (monocell) WB.

At this time, the first data calculation unit (monocell drive value calculation unit) 11B adjusts the drive values of all the cells CE of the first panel WB by multiplying the drive values of the plurality of cells CE stored in the monocell data calculation memory M2 by a necessary coefficient or by adding an offset to the drive values. Then, the first data calculation unit (monocell drive value calculation unit) 11B stores the adjusted drive values in the monocell drive value memory M3.

In step S10-2, the first panel drive unit (monocell drive unit) 20 drives the monocell, that is, the first panel WB by using the drive values stored in the monocell drive value memory M3.

In addition, in step S9, the second data generation unit 12 calculates luminance distribution of light passing through the cells CE from the backlight BL and reaching the pixels PX by using the drive values of the cells CE stored in the monocell drive value memory M3. That is, the second data generation unit 12 calculates the luminance distribution at the position of the main cell, that is, the second panel CL.

Thereafter, in step S10, the second data generation unit 12 corrects the input image data by using the calculated luminance distribution so as to compensate for the lack of luminance caused by limiting light traveling from the backlight BL to the pixels PX by the cells CE. The second data generation unit 12 stores the corrected input image data (corresponding to luminance) in the main cell drive value memory M4.

Thereafter, in step S10-1, the second panel drive unit (main cell drive unit) 30 drives the main cell, i.e., the second panel CL by using the corrected input image data stored in the main cell drive value memory M4.

In steps S2 to S7, the image processing device 10 sets the pixel PX of the calculation target from the input image data, and calculates the drive value of the cell CE while sequentially changing the pixel PX of the calculation target. However, the cell CE of the calculation target may be set from all the cells CE, and the drive value of the cell CE may be calculated while sequentially changing the cell CE of the calculation target. The same also applies to subsequent embodiments.

The distance calculation unit 11A preferably performs the processing of steps S3 to S5 for all the cells CE. However, doing so increases computational cost. There is a low possibility that the pixel PX of the calculation target affects the cell CE at a position far from the pixel PX of the calculation target. Thus, for example, the distance calculation unit 11A may perform the processing of steps S3 to S5 on the cells CE within a predetermined range from the pixel PX of the calculation target. The same applies to subsequent other embodiments.

In the flowchart shown in FIG. 8, the image processing device 10 according to the present embodiment sets the pixel PX as the reference for calculation of the drive values, and calculates the distance between the pixel PX of the calculation target and the monocell while sequentially changing the pixel PX of the calculation target. However, the image processing device 10 may set the monocell (cell CE) as the reference of the calculation of the drive values, and may calculate the distance between the pixel PX of the calculation target and the monocell while sequentially changing the monocell of the calculation target. The same applies to subsequent other embodiments.

Figure 9:
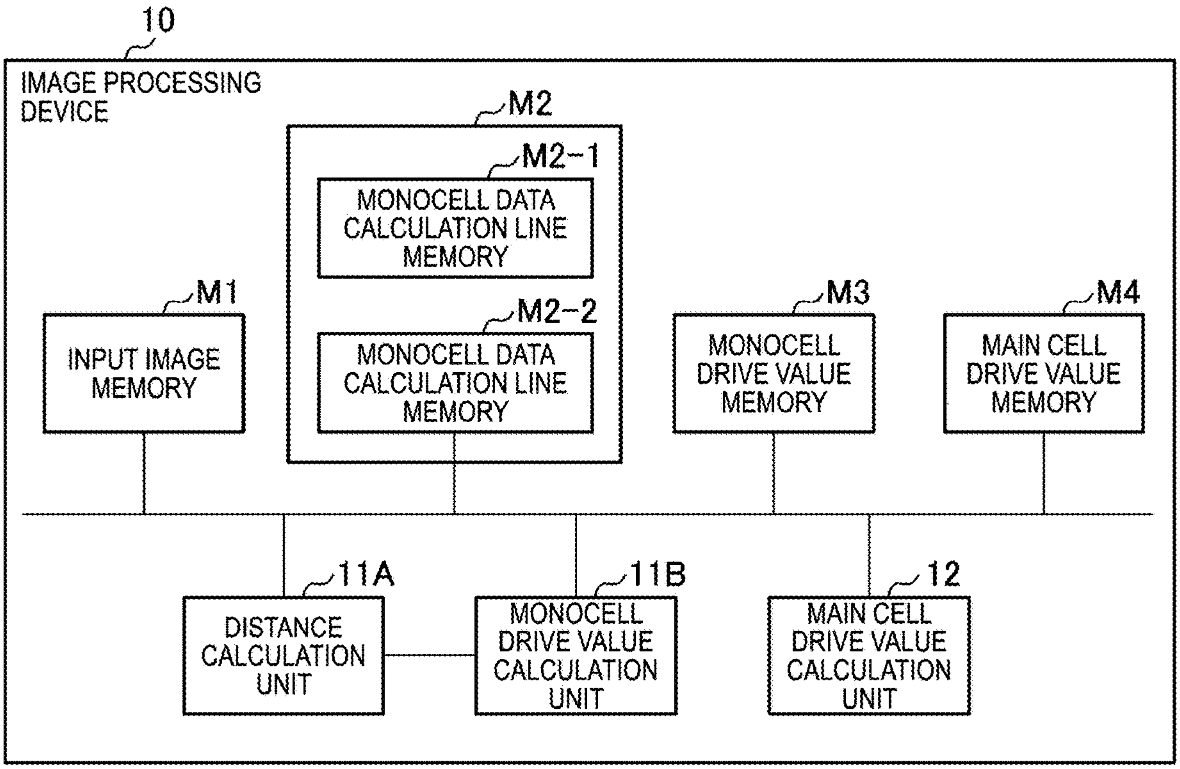
FIG. 9 is a diagram specifically illustrating an internal configuration of a second example of the image processing device according to the first embodiment.

FIG. 9 is a diagram specifically illustrating an internal configuration of a second example of the image processing device 10 according to the present embodiment.

As can be seen from a comparison between FIG. 7 and FIG. 9, the internal configuration of the second example is different from the internal configuration of the first example in that the monocell data calculation memory M2 includes a monocell data calculation line memories M2-1 and M2-2. Specifically, in the monocell data calculation memory M2, the drive values (corresponding to luminance) of only one row of the plurality of pixels PX forming the matrix constituting the input image data for one frame are alternately stored in each of the monocell data calculation line memories M2-1 and M2-2. The number (two) of the line memories described above is merely an example. The image processing device 10 may include three or more line memories and sequentially use them.

With this configuration, the same effects as those obtained by the image processing device 10 of the first embodiment can be obtained by a memory having a capacity smaller than that of the image processing device 10 according to the first embodiment.

Figure 10:
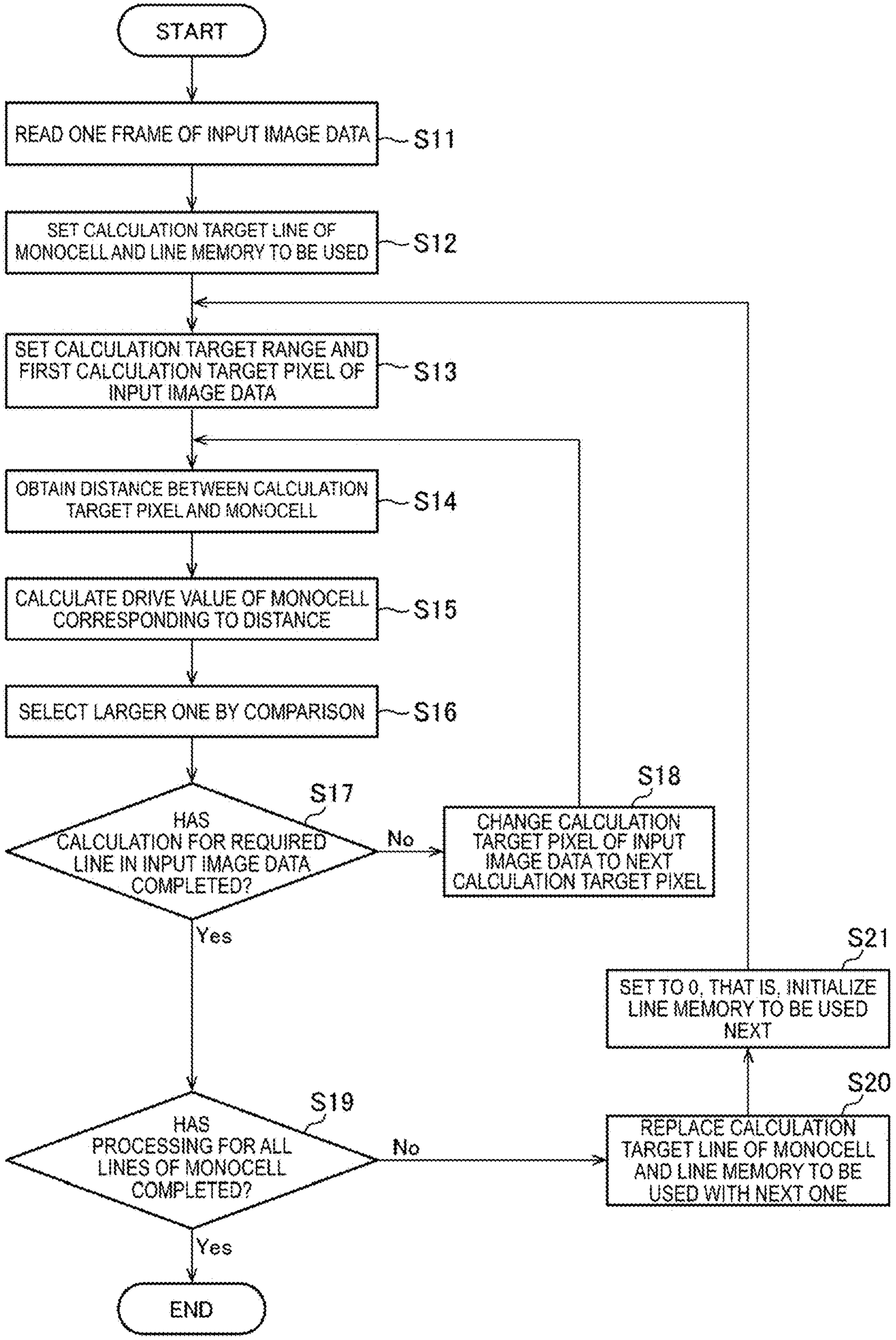
FIG. 10 is a flowchart 1 for describing processing executed by the second example of the image processing device according to the first embodiment.

FIG. 10 is a flowchart 1 for describing processing executed by the second example of the image processing device 10 according to the present embodiment.

In step S11, the image processing device 10 reads the input image data for one frame from the external device. The input image data is stored in the input image memory M1.

In step S12, the image processing device 10 sets a line (row) of the calculation target of the monocell (first panel WB) and a line memory to be used. Specifically, the distance calculation unit 11A sets the line (row) of the calculation target of the first panel WB (monocell). For example, first, the uppermost line of the first panel WB (monocell) is set as the line of the calculation target, and thereafter, the lines below the uppermost line are sequentially set as the lines of the calculation targets. Further, the distance calculation unit 11A sets one of the monocell data calculation line memories M2-1 and M2-2 to be used for the subsequent calculation. At this time, two line memories are alternately used.

In step S13, the image processing device 10 sets a calculation target range in the input image data. The setting of the calculation target range will be described in detail later. Then, the image processing device 10 sets the pixel PX of the first calculation target in the calculation target range of the input image data. For example, the image processing device 10 sets the leftmost and uppermost pixel PX in the calculation target range of the input image data as the first calculation target. The pixel PX of the calculation target is set from the upper left pixel PX in the input image data in order in the right direction, and when the right end of the input image data is reached, the pixel PX at the left end of one line below the input image data is set as the pixel PX of the calculation target.

A point different from step S2 of the first embodiment is that in the processing of steps S13 to S18 of the present embodiment, not all the input image data but some of the pixels PX are set as the calculation targets. More details will be described below.

In the second example of the image processing device 10 according to the present embodiment, in the processing of steps S13 to S18, data is updated in the calculation of the distance D1 only for one line (row) of the group of cells CE constituting the first panel (monocell) WB. Thus, the processing of steps S13 to S18 is performed only on the pixels PX in the input image data whose cells CE for one line are used to calculate the distance D1 (that is, the pixels PX included in the calculation target range of the input image data). The processing of step 13 is to set the calculation target range of the input image data. For example, in step 13, the image processing device 10 sets a plurality of lines in the input image data whose distance in the direction perpendicular to the line is within a predetermined range with respect to one line of the calculation target of the first panel (monocell) WB determined in step S12 as the calculation target range. According to this processing, when the one line of the calculation target of the first panel (monocell) WB determined in step S12 changes, the calculation target range of the input image data to be determined in step S13 also changes.

In step S14, the distance calculation unit 11A calculates the distance D1 between the specific position SC (center position) of the pixel PX of the calculation target and the predetermined positions (center positions CN) of the plurality of monocells (first panel WB) included in the line of the calculation target. That is, the distance calculation unit 11A calculates the distance D1 between one pixel PX of the calculation target and each of the plurality of cells CE. In step S15, the first data calculation unit (monocell drive value calculation unit) 11B calculates the drive value (value corresponding to luminance) of the monocell (each cell CE of the first panel WB) corresponding to the distance D1.

In step S16, the first data calculation unit (monocell drive value calculation unit) 11B compares the following (1) and (2) for each of the plurality of monocells.

(1) A drive value (corresponding to luminance) corresponding to the distance D1 between the pixel PX of the previous calculation target and the specific one monocell (first panel WB), which is stored in the monocell calculation line memory (one of the M2-1 and M2-2) currently used for the calculation.

(2) A drive value (corresponding to luminance) corresponding to the distance D1 between the pixel PX of the calculation target this time and the specific one monocell (first panel WB).

As a result, the first data calculation unit (monocell drive value calculation unit) 11B selects a larger drive value (corresponding to luminance) as a result of the comparison for each of the plurality of monocells that has been the calculation target. The selected drive value is overwritten in the monocell data calculation line memory (one of the M2-1 and M2-2) currently used for the calculation.

Next, in step S17, the image processing device 10 determines whether the processing in steps S14 to S16 for all the pixels PX included in the calculation target range of the input image data has been completed. In step S17, it may not be determined that the processing in steps S14 to S16 for all the pixels PX included in the calculation target range of the input image data has been completed. In this case, in step S18, the image processing device 10 changes the pixel PX of the calculation target in the input image data to the pixel PX of the next calculation target, and then repeats steps S14 to S17.

For example, in step S17, the image processing device 10 sets a pixel PX one pixel to the right of the pixel PX currently set as the calculation target as a pixel PX of a new calculation target. When the pixel PX currently set as the calculation target is the pixel PX at the right end, the pixel PX at the left end in a row one below the input image data is set as the pixel PX of the new calculation target.

On the other hand, in step S17, it may be determined that the processing in steps S14 to S16 for all the pixels PX included in the calculation target range in the input image data has been completed. This means that the processing related to the calculation target line of the monocell has been completed and the drive value of each monocell included in the calculation target line has been calculated. In this case, in step S19, the second data generation unit 12 determines whether the drive values (corresponding to luminance) of the cells CE of all the lines of the monocell (first panel WB) have been determined.

As a result, in step S19, it may not be determined that the drive values (corresponding to luminance) of the cells CE of all the lines of all the monocells (first panel WB) have been determined. In this case, in step S20, the image processing device 10 changes the line of the calculation target of the monocell (first panel WB) to a line of a next calculation target. In this case, two line memories are alternately used. Thereafter, in step S21, the image processing device 10 sets storage information of the line memory to be used next to 0, that is, initializes the storage information, and repeats steps S13 to S19.

Figure 11:
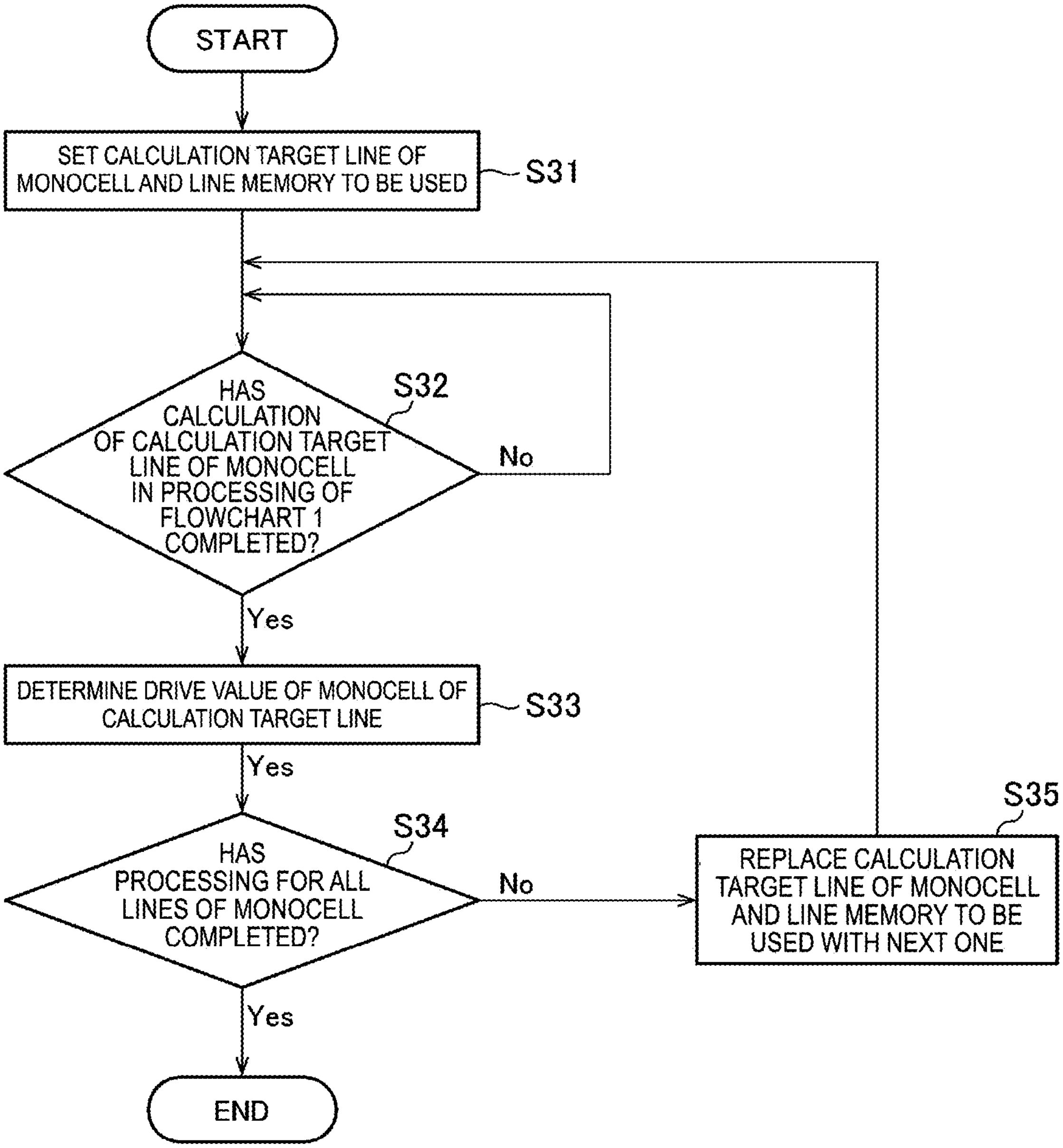
FIG. 11 is a flowchart 2 for describing processing executed by the second example of the image processing device according to the first embodiment.

FIG. 11 is a flowchart 2 for describing processing executed by the second example of the image processing device 10 according to the present embodiment. The processing of the flowchart 2 is executed in synchronization with and in parallel with the processing of the flowchart 1 shown in FIG. 10.

As shown in FIG. 11, in step S31, the image processing device 10 sets a line (row) of the calculation target of the monocell (first panel WB) and a line memory to be used. At this time, the image processing device 10 sets the line of the same monocell as the line (row) of the calculation target of the monocell (first panel WB) set in step S12 of the flowchart 1 as the calculation target line of the flowchart 2. In addition, the image processing device 10 sets the same line memory as the line memory to be used set in step S12 as the line memory to be used in the flowchart 2.

In step S32, the image processing device 10 determines whether the calculation of the line of the calculation target of the monocell in the processing of the flowchart 1 has been completed. Specifically, the image processing device 10 determines whether the determination result of step S17 of the flowchart 1 is Yes. In step S32, if the calculation of the line of the calculation target of the matrix of the cells CE constituting the monocell (first panel WB) has not been completed (specifically, if the determination result of step S17 of the flowchart 1 is not Yes), then the image processing device 10 repeats the processing of step S32.

On the other hand, in step S32, the calculation of the line of the calculation target of the monocell in the processing of the flowchart 1 may have been completed (specifically, a case where the determination in step S17 of the flowchart 1 is Yes). In this case, in step S33, the first data calculation unit (monocell drive value calculation unit) 11B determines the drive value (value corresponding to the luminance) of the line of the calculation target of the first panel (monocell) WB. At this time, the first data calculation unit (monocell drive value calculation unit) 11B multiplies the drive values of the plurality of cells CE stored in the monocell data calculation line memories by a necessary coefficient or adds an offset to the drive values. As a result, the first data calculation unit (monocell drive value calculation unit) 11B adjusts the drive value of the line of the calculation target of the first panel (monocell) WB. Then, the first data calculation unit (monocell drive value calculation unit) 11B stores the adjusted drive value in a region corresponding to the line of the calculation target in the monocell drive value memory M3.

In step S34, the image processing device 10 determines whether calculation of all the lines of the matrix of the cells CE constituting the monocell (first panel WB) of the line of the calculation target has been completed.

In step S34, the processing of all the lines of the monocell (cell CE of the first panel WB) of the line of the calculation target may not have been completed. In this case, in step S35, the image processing device 10 changes the line of the calculation target of the matrix of the cells CE constituting the monocell (first panel WB) to the next line. On the other hand, in step S34, if the calculation of all the lines of the calculation target of the matrix of the cells CE constituting the monocell (first panel WB) has been completed, then the image processing device 10 ends the processing.

Figure 12:
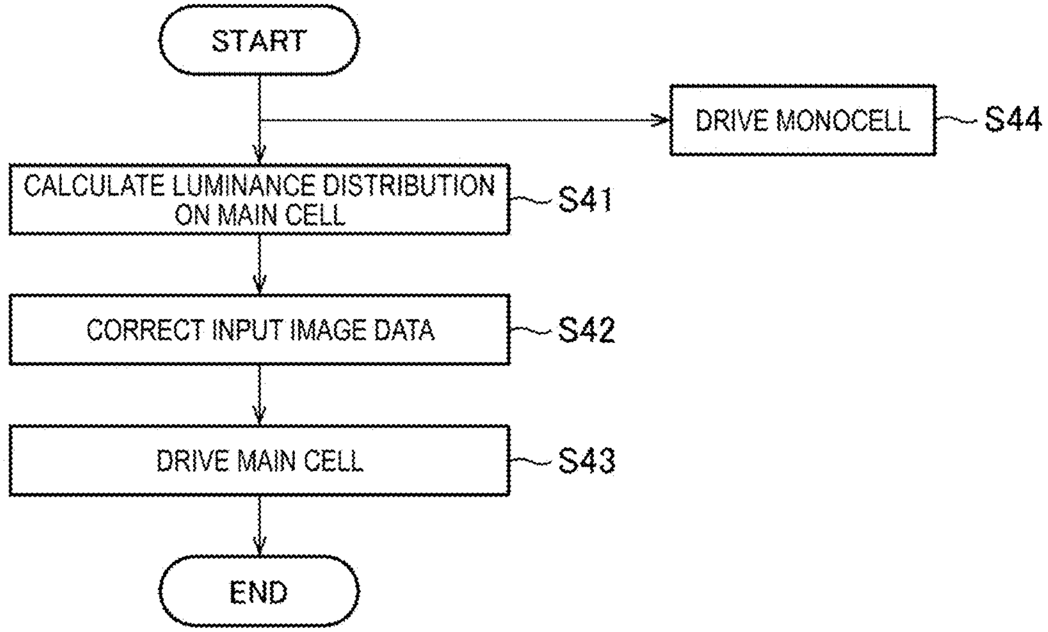
FIG. 12 is a flowchart 3 for describing processing executed by the second example of the image processing device according to the first embodiment.

FIG. 12 is a flowchart 3 for describing processing executed by the second example of the image processing device 10 according to the present embodiment. The image processing device 10 executes the processing of the flowchart 3, for example, after the processing of the flowchart 1 shown in FIG. 10 and the processing of the flowchart 2 shown in FIG. 11 have been completed and the drive values of all the monocells have been determined.

In step S41, the second data generation unit 12 calculates the luminance distribution on the main cell (pixel PX of the second panel CL) in the same manner as the processing in step 9. At the same time, in step S44, the first panel drive unit (monocell drive unit) 20 drives the monocell (first panel WB) by using the drive values stored in the monocell drive value memory M3.

In step S42, the second data generation unit 12 corrects the input image data read from the external device by using the calculated luminance distribution described above, and stores the corrected input image data in the main cell drive value memory M4, in the same manner as the processing in step S10. Thereafter, in step S43, the second panel drive unit (main cell drive unit) 30 drives the main cell (second panel CL) by using the gray scale values of the corrected input image data stored in the main cell drive value memory M4.

According to the above processing, when the first data calculation unit (monocell drive value calculation unit) 11B performs the processing of step S33 on the n-th line of the monocell in the processing of flowchart 2, the image processing device 10 determines (S20) the next calculation target line (n+1-th line) of the monocell in the processing of flowchart 1. As a result, the image processing device 10 executes processing related to the calculation target line. By performing such processing, the processing of the flowchart 1 and the processing of the flowchart 2 are executed in parallel.

Further, the image processing device 10 may sequentially perform the processing of the flowchart 3 from a step where the drive values of the predetermined amount of monocells necessary for the processing of step S41 and step S42 are determined by the processing of the flowcharts 1 and 2. By doing so, the processing of the flowchart 3 is executed in parallel with the processing of the flowcharts 1 and 2.

As described above, the image processing device 10 can calculate the monocell data by using the monocell data calculation memory M2 (FIG. 7) for storing the calculated values of the monocells for one frame, and can also calculate the monocell data by using the monocell data calculation line memories M2-1 and M2-2 (FIG. 9). The same applies to subsequent other embodiments.

FIG. 13A to FIG. 13E are diagrams each illustrating a state of a change in aperture ratios of cells CE of the first panel WB with respect to a change in input image data IM displayed by the display device 1 according to the first embodiment.

Figure 13A:
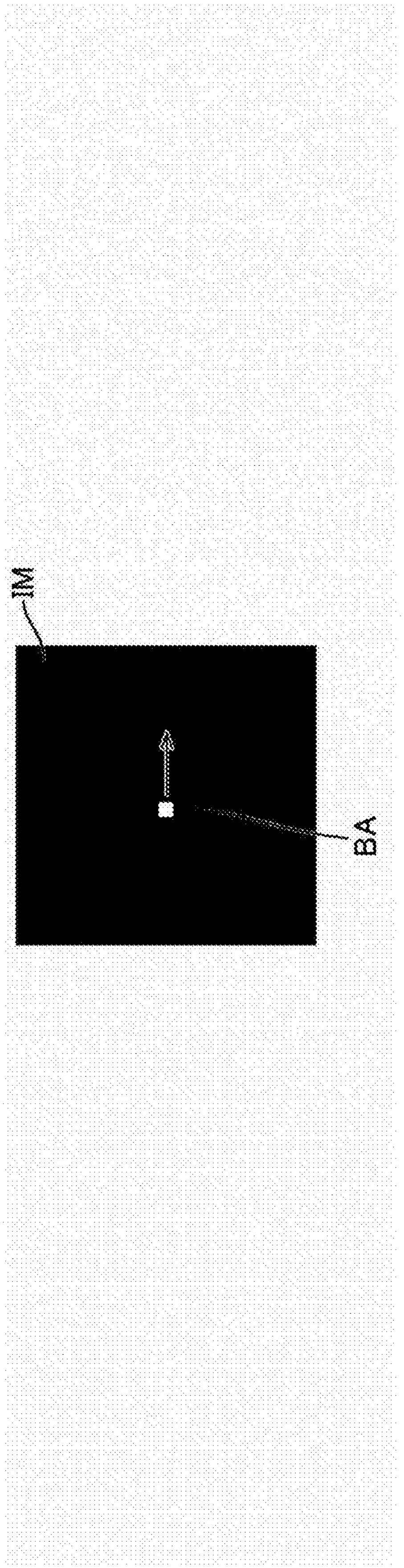
FIGS. 13A to FIG. 13E are diagrams each illustrating a state of a change in aperture ratios of cells of the first panel with respect to a change in input image data displayed by the display device according to the first embodiment.

FIG. 13A illustrates an example of the input image data IM. In the input image data IM, a high luminance region BA (for example, a region including a plurality of pixels each having a gray scale value of 255) is present in a background having a low gray scale (for example, a gray scale value of 0). The high luminance region BA may move in the right direction as time elapses.

Figures 13B, 13C, 13D, 13E:
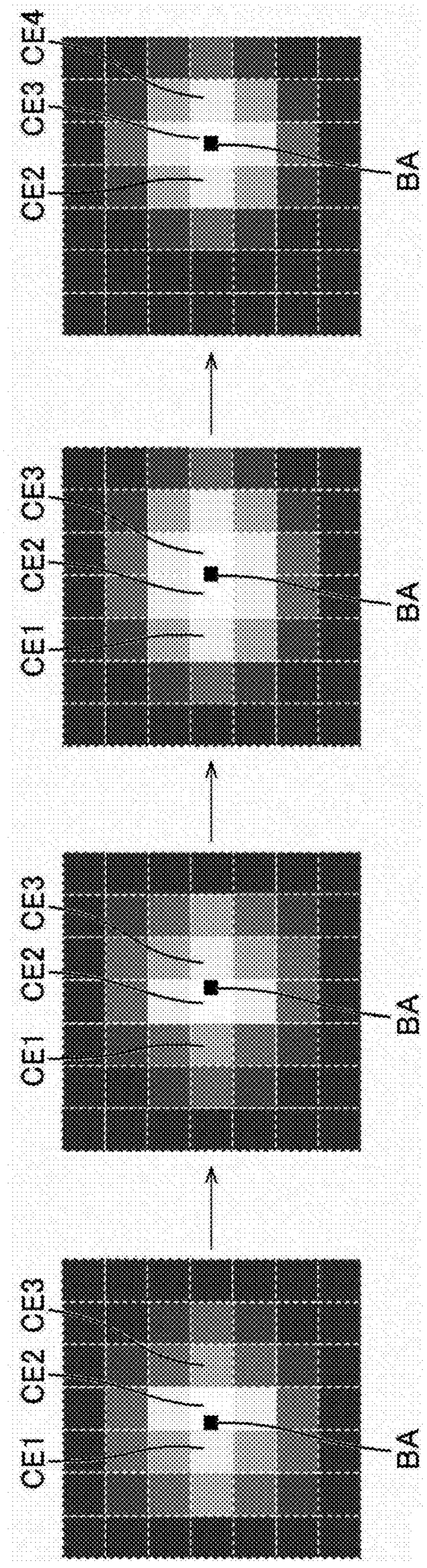
Figure 14A:
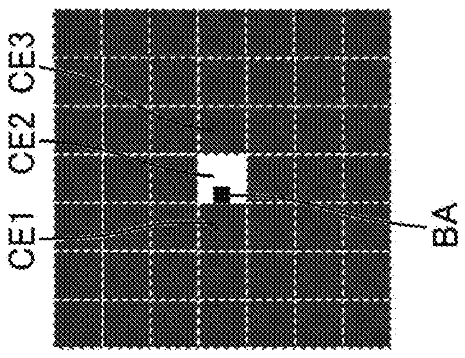
FIGS. 14A to FIG. 14D are diagrams each illustrating a state of a change in aperture ratios of cells of the first panel with respect to a change in input image data displayed by the display device of a comparative example.
Figure 14B:
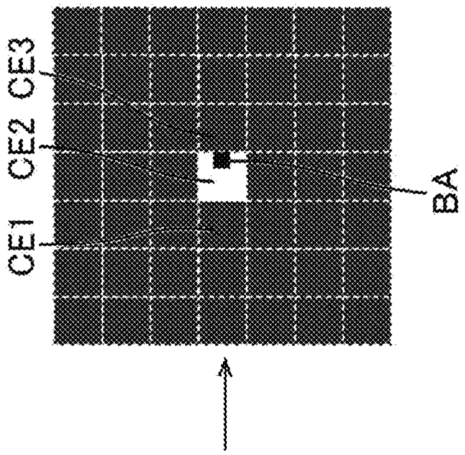
Figure 14C:
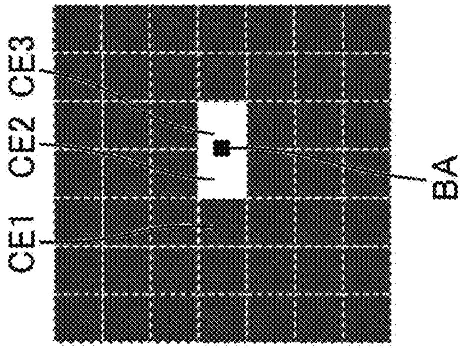
Figure 14D:
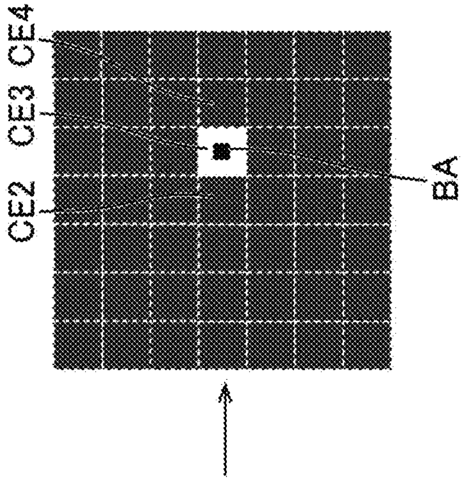

FIGS. 13(*b*) to 13(*e*) are diagrams illustrating the aperture ratios of the plurality of cells CE of the first panel WB corresponding to the input image data IM by gray scale shadings. The gray scale shading means that the darker the cell CE is, the smaller the aperture ratio is, and the lighter the cell CE is, the larger the aperture ratio is. In FIGS. 13(*a*) to 13(*e*), the high luminance region BA is also drawn to overlap the cells CE. However, in FIG. 13A to FIG. 13E, the high luminance region BA is drawn in black for clarity. As time elapses from FIG. 13B to FIG. 13E, the position of the high luminance region BA moves in the right direction. As illustrated in FIGS. 13(*b*) to 13(*e*), according to the image processing device 10 of the present embodiment, as the high luminance region BA moves, the aperture ratios of the plurality of cells CE gradually change without abruptly changing.

In FIG. 13B, the high luminance region BA is located in the cell CE2. Accordingly, the aperture ratio of the cell CE2 is the highest. In FIG. 13B, the high luminance region BA is located closer to the left side in the cell CE2. Thus, in FIG. 13B, of the cells CE1 and CE3 horizontally adjacent to the cell CE2, the cell CE1 relatively close to the high luminance region BA has a higher aperture ratio than the cell CE3 relatively far from the high luminance region BA. In FIG. 13C, the high luminance region BA is located closer to the right side in the cell CE2. Thus, in FIG. 13C, of the cells CE1 and CE3 horizontally adjacent to the cell CE2, the cell CE3 relatively close to the high luminance region BA has a higher aperture ratio than the cell CE1 relatively far from the high luminance region BA. In addition, the cells CE adjacent to the cells CE1 and CE3 in the vertical direction also change in the aperture ratios similar to the change in the aperture ratios of the cells CE1 and CE3. As can be seen from FIGS. 13(*b*) and 13(*c*), when the high luminance region BA is located in the cell CE2, the aperture ratios of the plurality of cells CE also change by a change in the position of the high luminance region BA in the cell CE2.

In FIG. 13D, the high luminance region BA moves to a position overlapping a boundary line between the cell CE2 and the cell CE3. In FIG. 13D, the cells CE2 and CE3 are controlled so as to have the same aperture ratio. In FIG. 13E, the high luminance region BA further moves and is located at the center of the cell CE3. In FIG. 13E, the cell CE3 has the highest aperture ratio, and the cells CE2 and CE4 adjacent to the cell CE3 in the horizontal direction are controlled so as to have the same aperture ratio.

As can be seen from FIG. 13A to FIG. 13E, according to the image processing device 10 of the present embodiment, the aperture ratio of each cell CE continuously changes both when the high luminance region BA in the input image data IM moves within a certain cell CE and when it moves across the plurality of cells CE. Thus, flicker can be suppressed.

FIG. 14A to FIG. 14D are diagrams each illustrating a state of a change in aperture ratios of cells CE of the first panel WB with respect to a change in the input image data IM displayed by the display device of a comparative example. Note that the input image data IM to be displayed is the same as the input image data IM illustrated in FIG. 13A.

As illustrated in FIGS. 14(*a*) and 14(*b*), according to the image processing device 10 of the comparative example, even when the high luminance region BA of the input image data moves in the cell CE2, the luminance of the cells CE in the periphery of the cell CE2 remains low and does not change. In FIG. 14C, the high luminance region BA moves to a position overlapping the boundary line between the cell CE2 and the cell CE3, and the cells CE2 and CE3 are controlled so as to have the same aperture ratio. Thus, when the state changes from FIG. 14B to FIG. 14C, the aperture ratio of the cell CE3 rapidly changes from a low state to a high state. Further, in FIG. 14D, the high luminance region BA further moves and is located at the center of the cell CE3. In FIG. 14D, the state becomes such that the aperture ratio of the cell CE3 is high and the aperture ratios of the other cells are low. Thus, when the state changes from FIG. 14C to FIG. 14D, the aperture ratio of the cell CE2 rapidly changes from the high state to the low state.

As can be seen from FIG. 14A to FIG. 14D, in the display device of the comparative example, when the high luminance region BA in the input image data IM moves in the certain cell CE, the aperture ratio of each cell CE does not change. On the other hand, when the high luminance region BA moves across the plurality of cells CE, the aperture ratio of each cell CE rapidly changes. Thus, the flicker occurs. In order to make the flicker less noticeable as compared with the comparative example, for example, it is conceivable to increase the aperture ratios of the cells CE in a somewhat wide range centered on the cell CE in which the high luminance region BA is located. However, by doing so, the meaning (for example, increasing the contrast) of overlapping the two panels including the first panel WB and the second panel CL is lost. On the other hand, according to the processing of the image processing device 10 of the present embodiment, the flicker can be reduced only by increasing the aperture ratios of the cells CE only in a narrow range centered on the cell CE in which the high luminance region BA is located, and even when amounts of increase in the aperture ratios of the cells CE in the periphery of the cell CE in which the high luminance region BA is located are small.

Figure 15:
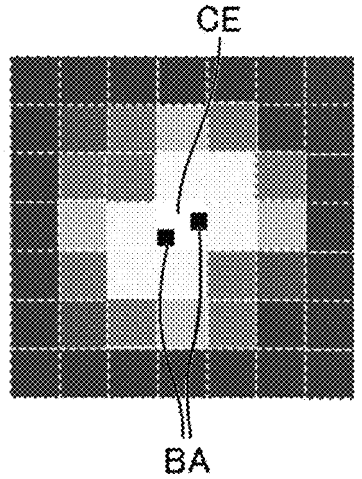
FIG. 15 is a diagram illustrating an example of the input image data displayed by the display device according to the first embodiment and aperture ratios of the cells of the first panel.

FIG. 15 is a diagram illustrating an example of the input image data IM displayed by the display device 1 according to the present embodiment and aperture ratios of the cells CE of the first panel WB. FIG. 15 illustrates a situation in which a plurality of the high luminance regions BA are present in a region in one cell CE.

As shown in FIG. 15, in the image processing device 10 of the present embodiment, when the plurality of high luminance regions BA included in the input image data IM are present in a region in the cell CE at the center position, the luminance of the cells CE at the peripheral positions is generated so as to be affected by the plurality of high luminance regions BA. Specifically, one of the high luminance regions BA is located at the upper right and the other is located at the lower left, in the cell CE at the center position. Due to the influence of these high luminance regions BA, the cell CE located in an obliquely upper right direction and the cell CE located in an obliquely lower left direction from the cell CE at the center position have high aperture ratios. The display of the image processing device 10 is different from the display of the image processing device 10 of a second embodiment described later in that when two high luminance regions BA having luminance higher than the luminance of the images in a periphery of the center cell CE are present, the luminance of the peripheral cells CE is adjusted according to the position of each of the two high luminance regions BA.

As described above, according to the image processing device 10 of the present embodiment, the aperture ratio of each cell CE continuously changes even when the high luminance region BA in the input image data IM moves in a region inside the one cell CE or moves across the plurality of cells CE. Thus, flicker can be suppressed. As another means for continuously changing the aperture ratio of each cell CE, it is conceivable to perform filter processing in the time direction. However, the processing in the image processing device 10 of the present embodiment is processing that is completed for each frame of the input image data, and is not processing that requires a plurality of continuous frames of the input image data. Thus, according to the image processing device 10 of the present embodiment, resources such as a memory required for the processing can be reduced and a delay time caused by the processing can be shortened.

Second Embodiment

The image processing device 10 according to a second embodiment will be described with reference to FIGS. 16 to 29. Note that description of points similar to those in the image processing device 10 of the embodiment will not be repeated below. The image processing device 10 of the present embodiment is different from the image processing device 10 of the first embodiment in the following respects.

Figure 16:
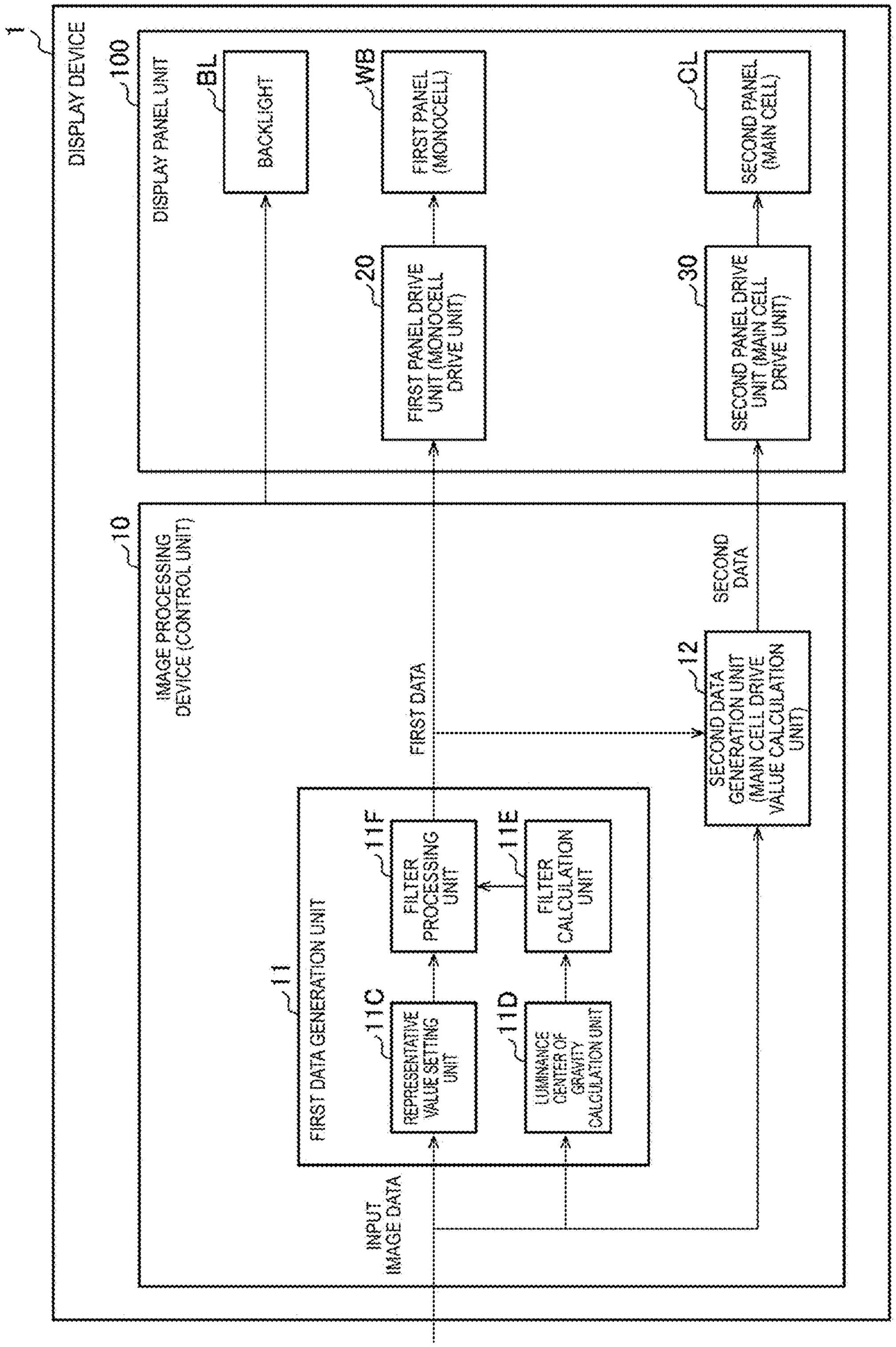
FIG. 16 is a block diagram illustrating an overall configuration of a display device according to a second embodiment.

FIG. 16 is a block diagram illustrating an overall configuration of the display device 1 according to the present embodiment.

As illustrated in FIG. 16, the first data generation unit 11 includes a representative value setting unit 11C, a luminance center of gravity calculation unit 11D, a filter calculation unit 11E, and a filter processing unit 11F.

The representative value setting unit 11C sets a representative value of each of the plurality of second cells CE based on the input luminance of the plurality of second pixels PX at a position facing each of the plurality of second cells CE. Specifically, the representative value setting unit 11C uses, for example, the maximum value among luminance values of the plurality of pixels PX in the region facing one cell CE as the representative value of the cell CE. In addition, the luminance center of gravity calculation unit 11D calculates the luminance center of gravity of each of the plurality of second cells CE based on the input luminance and the positions of the plurality of second pixels PX.

The filter calculation unit 11E calculates a filter coefficient for each of the plurality of second cells CE. That is, when one of the plurality of second cells CE is set as a center cell CE, the filter calculation unit 11E calculates the filter coefficients of the two dimensional filter for the center cell CE and a plurality of, for example, eight peripheral cells CE surrounding the center cell CE so as to include the first cell CE, that is, a total of nine cells CE based on the luminance center of gravity of the center cell CE. In this case, the filter calculation unit 11E provides a bias to the filter coefficients constituting the matrix based on the calculation result of the luminance center of gravity. The filter before providing the bias is, for example, a low pass filter such as a Gaussian filter or a smoothing filter.

For each of the plurality of second cells CE, the filter processing unit 11F performs filter processing on the representative values of the plurality of cells CE with the second cell CE as the center cell by using the filter coefficients calculated by the filter calculation unit 11E. Thereby, the first data for the first cell CE, that is. the drive value of the cell CE, is generated. That is, the filter processing unit 11F performs the filter processing on the representative values of the plurality of cells CE constituting the first panel WB, thereby performing blur processing on the representative values of the plurality of cells CE. Note that, as in the first embodiment, the certain cell CE may serve as the first cell CE or the second cell CE. Thus, the processing performed by the representative value setting unit 11C, the luminance center of gravity calculation unit 11D, the filter calculation unit 11E, and the filter processing unit 11F are performed on all the cells CE as a result.

According to the image processing device 10 as well, in a region inside the certain cell CE when, an image smaller in size than the certain cell CE and having higher luminance than peripheral images moves, control for adjusting the actual luminance of the peripheral cells CE surrounding the certain cell CE can be performed. As a result, in a region inside the certain cell CE, when the image IM smaller in size than the certain cell CE and having higher luminance than peripheral images moves, the image processing device 10 can be suppress the occurrence of flicker.

Figure 17:
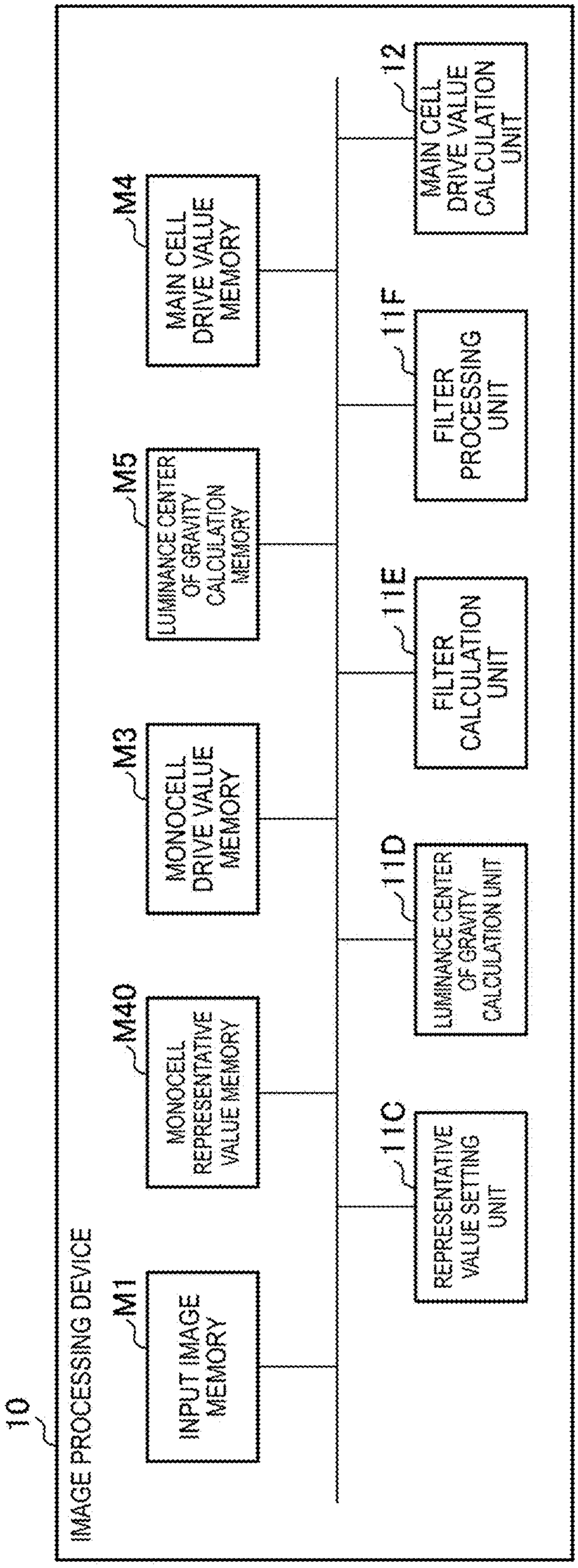
FIG. 17 is a diagram specifically illustrating an internal configuration of an example of the image processing device according to the second embodiment.

FIG. 17 is a diagram specifically illustrating an internal configuration of an example of the image processing device 10 according to the present embodiment.

As illustrated in FIG. 17, the image processing device 10 of the present embodiment is different from the image processing device 10 according to the first embodiment in that a luminance calculation memory M5 and a monocell representative value memory M40 are included. The image processing device 10 according to the present embodiment includes the representative value setting unit 11C, the luminance center of gravity calculation unit 11D, the filter calculation unit 11E, and the filter processing unit 11F, instead of the distance calculation unit 11A and the first data calculation unit 11B. In this respect, the image processing device 10 of the present embodiment is different from the image processing device 10 of the first embodiment.

The input image memory M1 is a memory for storing the input image data for one frame. The monocell representative value memory M40 is a memory for storing the representative value (maximum value) of the luminance of the plurality of pixels PX facing the monocells for one frame, that is, the cells CE of the first panel WB. The monocell drive value memory M3 is a memory for storing a plurality of monocell drive values calculated for the plurality of pixels PX for one frame.

The luminance center of gravity calculation memory M5 is a luminance center of gravity calculation memory for each cell CE for one frame. The luminance center of gravity calculation memory M5 stores five values of Equations (3) to (7) described later for one cell CE. The main cell drive value memory M4 is a memory for storing the calculated main cell drive values for one frame, that is, the drive values (luminance) of the pixels PX of the second panel CL.

Figure 18:
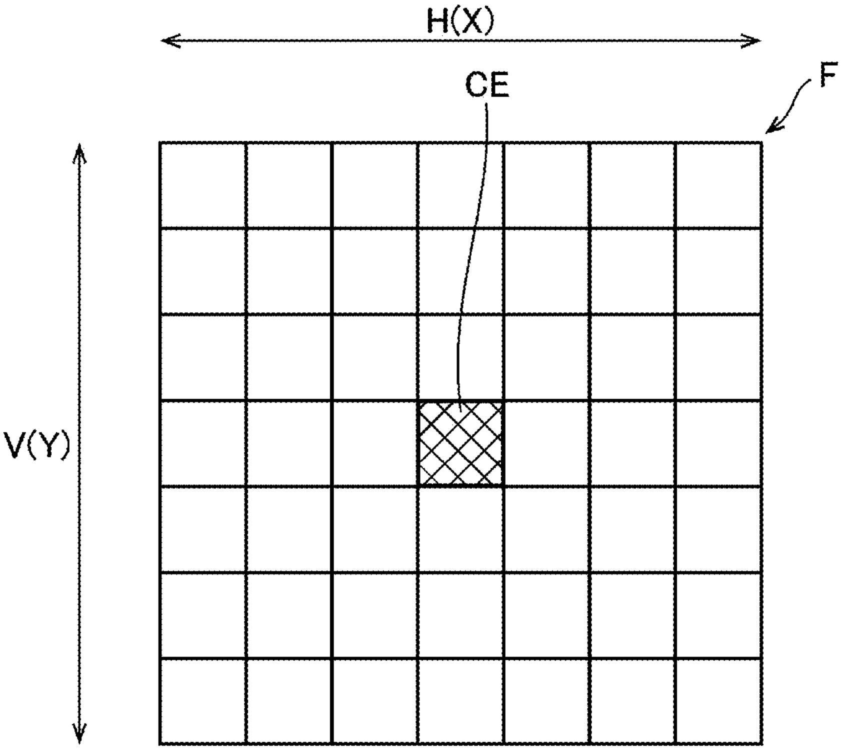
FIG. 18 is a diagram for describing a two dimensional filter of the monocell of the display device of the comparative example.

FIG. 18 is a diagram for describing a two dimensional filter F of the monocell (cell CE of the first panel WB) of the display device 1 of the comparative example.

As illustrated in FIG. 18, the two dimensional filter used in the image processing device 10 according to the present embodiment is, for example, a 7×7 BLUR filter (without eccentricity). The two dimensional filter F includes filter coefficients corresponding to one center cell CE provided at a center position of the two dimensional filter F and a plurality of, for example, 48 peripheral cells CE provided so as to surround the one center cell CE. One center cell CE and 48 peripheral cells CE are disposed in a matrix form arranged in each of the vertical direction V (Y direction) and the horizontal direction H (X direction).

Figure 19:
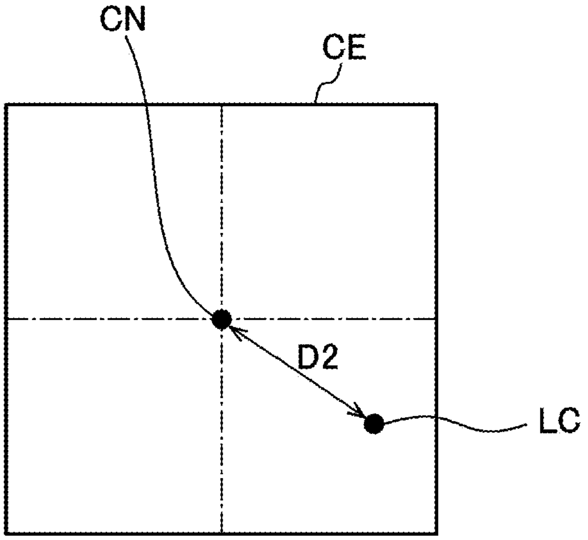
FIG. 19 is a diagram for describing a relationship between a center position of a center cell of a monocell and a luminance center of gravity of the display device according to the second embodiment.

FIG. 19 is a diagram for describing a relationship between the center position CN of the center cell CE of the monocell (first panel WB) and a luminance center of gravity LC of the display device 1 according to the present embodiment. As illustrated in FIG. 19, the distance between the center position CN of the center cell CE and the luminance center of gravity LC in the center cell CE is D2.

The filter calculation unit 11E calculates the filter coefficients of the two dimensional filter by performing correction for the plurality of peripheral cells CE present on a side of the luminance center of gravity LC to increase the filter coefficients of the low pass filter with the representative position RP of the center cell CE as the reference. The representative position RP is, for example, the center position of the cell CE, specifically, the position of the intersection of the diagonal lines of the rectangular center cell CE, that is, the center position CN.

On the other hand, the filter calculation unit 11E performs correction for the plurality of peripheral cells CE present on a side opposite to the side of the luminance center of gravity LC to decrease the filter coefficients of the low pass filter with the representative position RP of the center cell CE as the reference. As a result, post-correction filter coefficients of the two dimensional filter are calculated.

Specifically, the filter calculation unit 11E corrects the coefficients of the low pass filter so that an amount of change of the coefficients of the low pass filter due to the correction increases as the distance D2 between the representative position RP of the center cell CE and the luminance center of gravity LC increases. As a result, the filter coefficients of the two dimensional filter are calculated.

Figure 20:
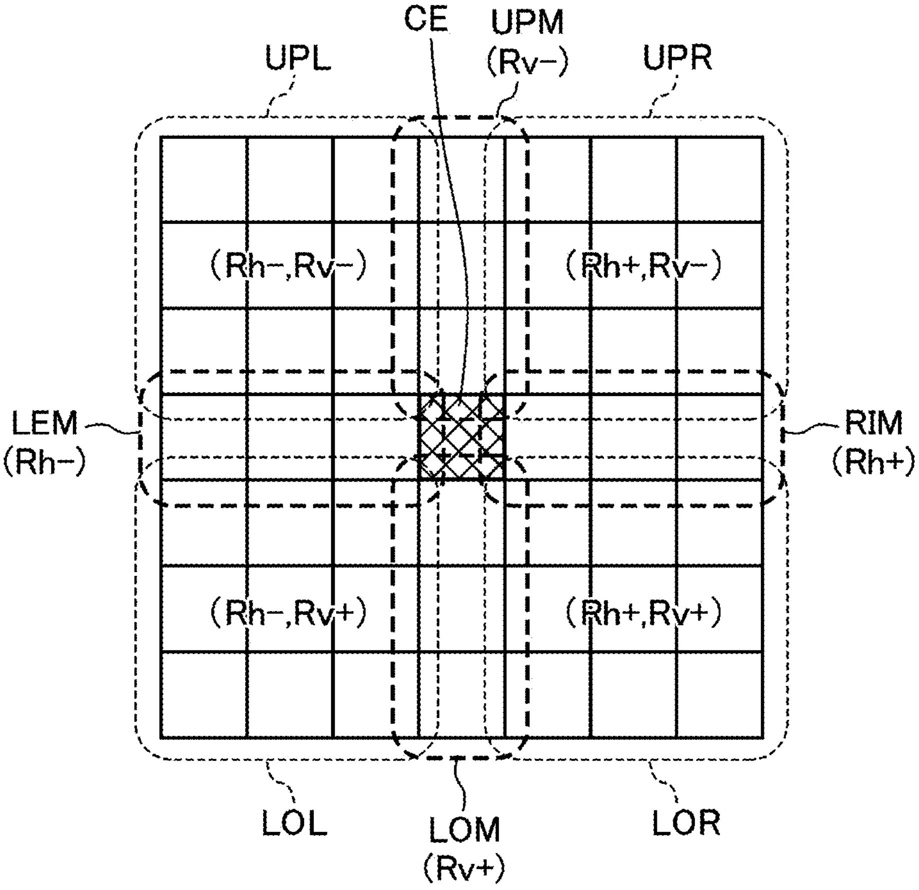
FIG. 20 is a diagram for describing filter processing of the monocell of the display device according to the second embodiment.

FIG. 20 is a diagram for describing filter processing of the monocell (first panel WB) of the display device 1 according to the present embodiment. FIG. 20 illustrates an upper left peripheral cell matrix UPL, an upper center peripheral cell column UPM, an upper right peripheral cell matrix UPR, a left center peripheral cell row LEM, a center cell CE, a right center peripheral cell row RIM, a lower left peripheral cell matrix LOL, a lower center peripheral cell column LOM, and a lower right peripheral cell matrix LOR.

For this reason, the filter coefficients of the two dimensional filter are corrected using the following correction factors Rh+, Rv+, Rh−, and Rv− of the filter coefficient. In a coordinate system specified by an H direction and a V direction, coordinates on the right side of the center position in the X direction are represented by a positive sign, and coordinates on the lower side of the center position in the Y direction are represented by a positive sign.

The correction factor Rh+ is a value for correcting a filter coefficient located on the right side (positive) of the center in the X direction. The correction factor Rh− is a value for correcting a filter coefficient located on the left side (negative) of the center in the X direction. The correction factor Rv+ is a value for correcting a filter coefficient located on the lower side (positive) of the center in the Y direction. The correction factor Rv− is a value for correcting a filter coefficient located on the upper side (negative) of the center in the Y direction.

Each of the correction factors Rh+, Rv+, Rh−, and Rv− is calculated by the following calculation formula.

Correction factors Rh+, Rv+, Rh−, and Rv−=(sign) constant C×distance D2 (Calculation formula)

Note that C is a predetermined value. As described above, the distance D2 is the distance between the center position CN of the center cell CE and the luminance center of gravity LC in the center cell CE.

Thus, the larger the distance D2 between the center position CN of the center cell CE and the luminance center of gravity LC, the larger the absolute value of the correction factor of the filter coefficient, and the smaller the distance D2 between the center position CN of the center cell CE and the luminance center of gravity LC, the smaller the absolute value of the correction factor of the filter coefficient. Further, the filter coefficient of the center cell CE is not affected by the position of the luminance center of gravity of the peripheral cells CE.

The filter calculation unit 11E determines the sign in the calculation formula of the correction factor as follows according to the relationship between the position of the luminance center of gravity LC of the center cell CE and the center position CN of the center cell CE.

When the luminance center of gravity LC of the center cell CE is located in the positive direction of the center position CN of the center cell CE in the X direction, the filter calculation unit 11E sets the sign of Rh+ to + and sets the sign of Rh− to −. When the luminance center of gravity LC of the center cell CE is located in the negative direction of the center position CN of the center cell CE in the X direction, the filter calculation unit 11E sets the sign of Rh+ to − and sets the sign of Rh− to +.

When the luminance center of gravity LC of the center cell CE is located in the positive direction of the center position CN of the center cell CE in the Y direction, the filter calculation unit 11E sets the sign of Rv+ to + and sets the sign of Rv− to −. When the luminance center of gravity LC of the center cell CE is located in the negative direction of the center position CN of the center cell CE in the Y direction, the filter calculation unit 11E sets the sign of Rv+ to − and sets the sign of Rv− to +.

In the upper left peripheral cell matrix UPL, the post-correction filter coefficients are calculated by adding Rh− and Rv− to pre-correction filter coefficients. In the center upper peripheral cell column UPM, the post-correction filter coefficients are calculated by adding Rv− to the pre-correction filter coefficients. In the upper right peripheral cell matrix UPR, the post-correction filter coefficients are calculated by adding Rh+ and Rv− to the pre-correction filter coefficients.

In the left center peripheral cell row LEM, the post-correction filter coefficients are calculated by adding Rh− to the pre-correction filter coefficients. In the right center peripheral cell row RIM, the post-correction filter coefficients are calculated by adding Rh+ to the pre-correction filter coefficients.

In the lower left peripheral cell matrix LOL, the post-correction filter coefficients are calculated by adding Rh− and Rv+ to the pre-correction filter coefficients. In the lower center peripheral cell column LOM, the post-correction filter coefficients are calculated by adding Rv+ to the pre-correction filter coefficients. In the lower right peripheral cell matrix LOR, the post-correction filter coefficients are calculated by adding Rh+ and Rv+ to the pre-correction filter coefficients.

On the other hand, in the center cell CE, the filter coefficient is not corrected.

The above-described filter processing is executed for each of the plurality of cells CE. For example, when there are 144 (=16×9) cells CE, filter calculation and filter processing using "post-correction 7×7 BLUR filter" are performed 144 times.

Figure 21:
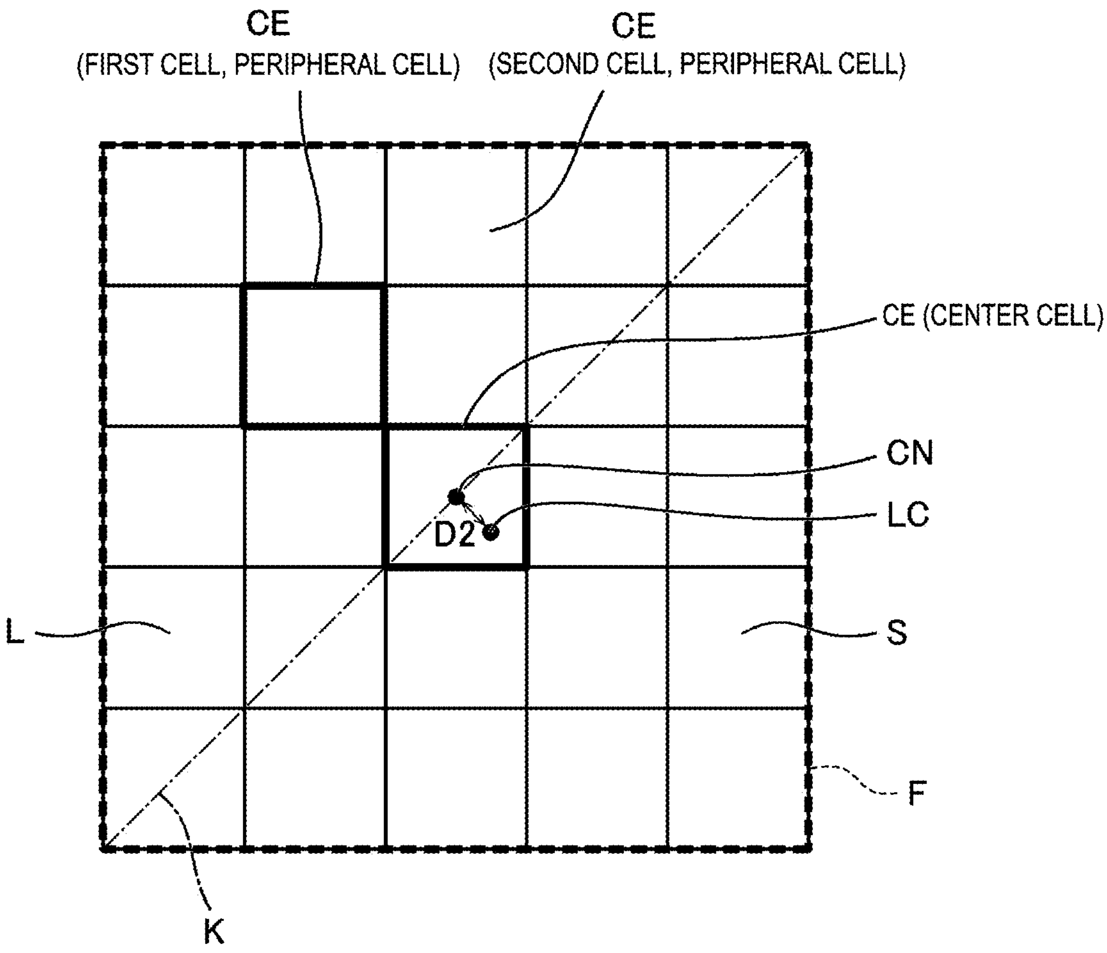
FIG. 21 is a diagram for describing a relationship among a center cell, peripheral cells, first cells, and second cells of a two dimensional filter of five rows and five columns, for example, in the display device according to the second embodiment.

FIG. 21 is a diagram for describing a relationship among the center cell CE, the peripheral cells CE, the first cell, and the second cells of the two dimensional filter F of five rows and five columns, for example, in the display device 1 according to the present embodiment. FIG. 21 illustrates the two dimensional filter in association with cells CE.

In the two dimensional filter F illustrated in FIG. 21, the cell located at the center is the center cell. Twenty four cells other than the center cell are the peripheral cells. FIG. 21 illustrates a case where a cell of one pixel upper left to the center cell is the first cell. The 24 cells other than the first cell are the second cells. As described above, each cell in the two dimensional filter F has two attributes, which are an attribute indicating whether the cell is the center cell or the peripheral cell, and an attribute indicating whether the cell is the first cell or the second cell.

As illustrated in FIG. 21, the two dimensional filter F includes, with a diagonal line K drawn from the upper right to the lower left of the two dimensional filter F as a boundary line, a region L located on the upper left side of the diagonal line K and a region S located on the lower right side of the diagonal line K.

The position of the luminance center of gravity LC of the center cell CE of the two dimensional filter F is located in an obliquely lower right direction of the center position CN (representative position RP) of the center cell CE. Thus, the correction factors are Rh+>0, Rv+>0, Rh−<0, and Rv−<0. With these correction factors, the two dimensional filter F is generally corrected so that the filter coefficients located on the upper left side, that is, in the region L become smaller, and the filter coefficients located on the lower right side, that is, in the region S become larger.

That is, in the two dimensional filter F illustrated in FIG. 21, the filter coefficients in the region L on the side opposite to the side where the luminance center of gravity LC of the center cell CE deviates from the center position CN of the center cell CE is decreased, and the filter coefficients in the region S on the side where the luminance center of gravity LC of the center cell CE deviates from the center position CN of the center cell CE is increased.

FIG. 22 is a diagram showing an example of pre-correction filter coefficients of a low pass filter as an example of the two dimensional filter used in the image processing device 10 of the display device 1 according to the present embodiment. The pre-correction 5×5 two dimensional filter F is a Gaussian filter, which is an example of the low pass filter. The pre-correction 5×5 two dimensional filter F is designed so that the sum of all the filter coefficients becomes 1.

As shown in FIG. 22, the two dimensional filter F has filter coefficients that are bilaterally symmetrical and vertically symmetrical. In the two dimensional filter F, the value of the filter coefficient is the largest in the center cell CE and decreases from the center cell CE toward the outside.

FIG. 23 is a diagram showing an example of coordinates of the luminance center of gravity LC used in the image processing device 10 of the display device 1 according to the present embodiment.

As shown in FIG. 23, the coordinates of the luminance center of gravity LC are, for example, 2.5 in the X direction, that is, the H direction, and 2 in the Y direction, that is, the V direction.

It is assumed that there is a region including n pixels PX, an x coordinate of an i-th pixel PX is $x_i$, a y coordinate of the i-th pixel PX is $y_i$, and luminance (gray scale value) of the i-th pixel PX is $G_i$. When an x coordinate of the luminance center of gravity is cx and a y coordinate of the luminance center of gravity is $c_y$, $c_x$ and $c_y$ are calculated by the following Equations (1) and (2).

[Mathematical Expression 1]

$$c_x = \frac{\sum_{i=1}^{n}(x_i \cdot G_i)}{\sum_{i=1}^{n} G_i} \quad \text{EQUATION (1)}$$

$$c_y = \frac{\sum_{i=1}^{n}(y_i \cdot G_i)}{\sum_{i=1}^{n} G_i} \quad \text{EQUATION (2)}$$

The numerator and denominator of Equations (1) and (2) can be expressed in separate Equations as follows.

[Equation 2]

$$ct_x = \sum_{i=1}^{n}(x_i \cdot G_i) \quad \text{EQUATION (3)}$$

$$ct_y = \sum_{i=1}^{n}(y_i \cdot G_i) \quad \text{EQUATION (4)}$$

$$cb_x = cb_y = \sum_{i=1}^{n} G_i \quad \text{EQUATION (5)}$$

$$c_x = ct_x/cb_x \quad \text{EQUATION (6)}$$

$$c_y = ct_y/cb_y \quad \text{EQUATION (7)}$$

The luminance center of gravity LC is calculated using the above-described Equations (3), (4), (5), (6), and (7).

FIG. 24 is a diagram showing an example of a constant C of an operation used in the image processing device 10 of the display device 1 according to the present embodiment.

As shown in FIG. 24, the constant C is 0.0005.

FIG. 25 is a diagram showing an example of correction factors of the filter coefficients used in the image processing device 10 of the display device 1 according to the present embodiment. These correction factors are values calculated using the luminance center of gravity position shown in FIG. 23 and the constant C shown in FIG. 24. As shown in FIG. 25, the correction factors of the filter coefficients are Rh+>0, Rv+>0, Rh−<0, and Rv−<0.

FIG. 26 is a diagram showing an example of post-correction filter coefficients of the two dimensional filter F used in the image processing device 10 of the display device 1 according to the present embodiment.

When the post-correction filter coefficients shown in FIG. 26 are compared with the pre-correction filter coefficients shown in FIG. 22, it is understood that the filter coefficient of the center cell CE does not change, but each of the plurality of peripheral cells CE changes according to the correction factor. Specifically, in the post-correction filters in FIG. 26, the filter coefficients at the lower right of the matrix are larger and the filter coefficients at the upper left of the matrix are smaller than the pre-correction filter coefficients shown in FIG. 22.

Figure 27:
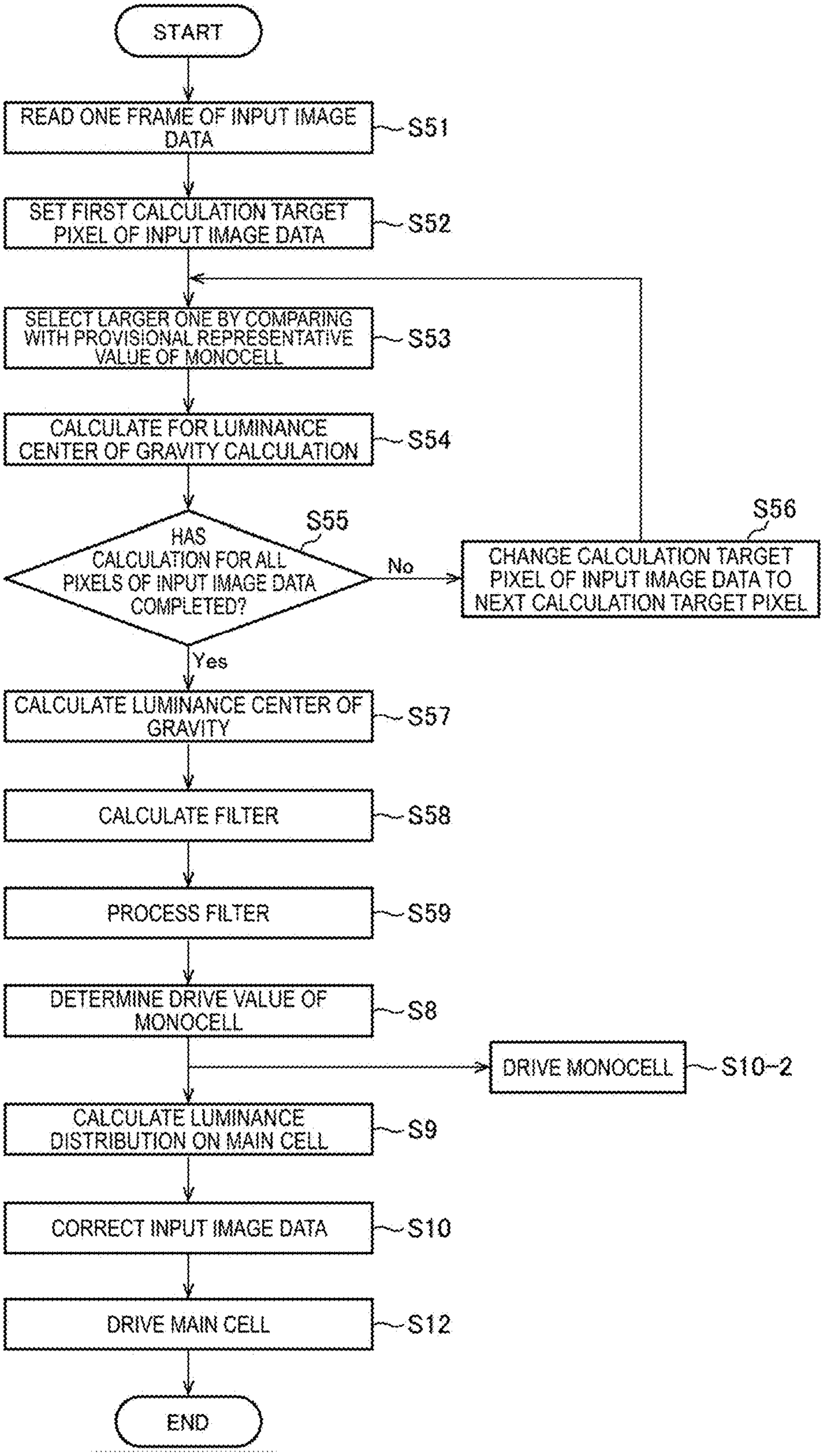
FIG. 27 is a flowchart for describing processing executed by an example of the image processing device according to the second embodiment.

FIG. 27 is a flowchart for describing processing executed by an example of the image processing device 10 according to the present embodiment.

In step S51, the image processing device 10 reads the input image data for one frame from the external device. In step S52, the image processing device 10 sets a pixel PX of a first calculation target of the input image data. For example, the image processing device 10 sets the leftmost and uppermost pixel PX in the input image data as the first calculation target. In step S53, the representative value setting unit 11C compares a previous provisional representative value of the monocell (cell CE) including the pixel PX of the calculation targets in the region with the gray scale value of the pixel PX of the calculation target. When the gray scale value of the pixel PX of the calculation target is larger than the previous provisional representative value of the monocell (cell CE) including the pixel PX of the calculation target in the region, the representative value setting unit 11C stores the gray scale value of the pixel PX of the calculation target in the monocell representative value memory M40 as a new provisional representative value of the monocell. When the processing of step S53 is performed on all the pixels PX included in the input image data for one frame, the maximum gray scale value of the pixels PX included in the region of each monocell is selected as the representative value for the monocell.

In step S54, the luminance center of gravity calculation unit 11D performs calculation for calculating the luminance center of gravity LC. Specifically, the luminance center of gravity calculation unit 11D calculates the values related to the above-described Equations (3) to (5) for the pixel PX of the calculation target. As a result, the luminance center of gravity calculation unit 11D adds the values related to the above-described Equations (3) to (5) to values of $ct_x$, $ct_y$, and $cb_x$ ($=cb_y$), respectively, which are related to each monocell and stored in the luminance center of gravity calculation memory M5. When the processing of step S54 is performed on all the pixels PX included in the input image data for one frame, the values of $ct_x$, $ct_y$, and $cb_x$ ($=cb_y$) are calculated for each monocell.

In step S55, the image processing device 10 determines whether the calculations in steps S53 and S54 for all the pixels PX included in the input image data have been completed.

In step S55, it may not be determined that the calculations in steps S53 to S54 for all the pixels PX included in the input image data have been completed. In this case, in step S56, the image processing device 10 changes the pixel PX of the calculation target in the input image data to the next pixel PX, and repeats steps S53 to S55.

On the other hand, in step S55, if it is determined that the calculations in steps S53 and S54 for all the pixels PX included in the input image data have been completed, then in step S57, the luminance center of gravity calculation unit 11D calculates the luminance center of gravity LC. The method of calculating the luminance center of gravity LC is as described above. That is, the luminance center of gravity LC is calculated by performing the calculations of Expression (6) and Expression (7). The luminance center of gravity calculation unit 11D stores the calculated value of the luminance center of gravity LC in the luminance center of gravity calculation memory M5.

Next, in step S58, the filter calculation unit 11E calculates the correction factors of the filter coefficients of the two dimensional filter F by using the value of the luminance center of gravity LC, and corrects the filter coefficients of the two dimensional filter F by using the calculated correction factors. Thereafter, in step S59, the filter processing unit 11F performs filter processing on each monocell (cell CE) by using the corrected filter coefficients of the two dimensional filter.

FIG. 28A to FIG. 28D are diagrams each illustrating a state of a change in aperture ratios of cells CE of the first panel WB with respect to a change in the input image data IM displayed by the display device 1 according to the present embodiment. Since the input image data IM is the same as that illustrated in FIG. 13A, the input image data IM is not illustrated. As illustrated in FIG. 13A, in the input image data IM, the high luminance region BA (for example, a region including a plurality of pixels each having a gray scale value of 255) is present in a background having a low gray scale (for example, a gray scale value of 0). The high luminance region BA may move in the right direction as time elapses.

Figures 28A, 28B, 28C, 28D:
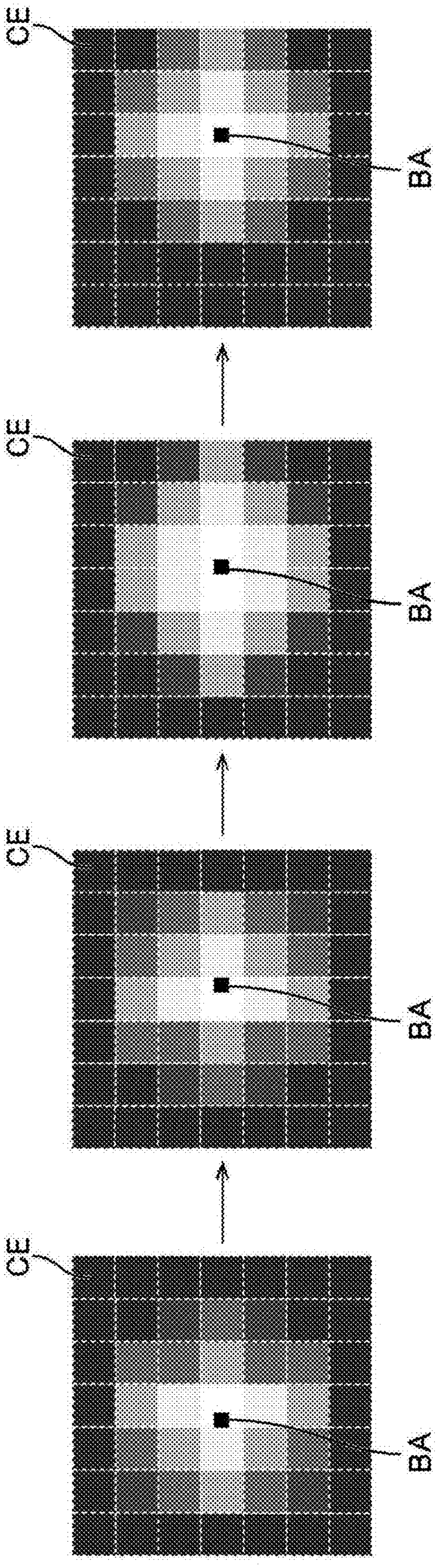
FIGS. 28A to FIG. 28D are diagrams each illustrating a state of a change in aperture ratios of cells of the first panel with respect to a change in input image data displayed by the display device according to the second embodiment.

FIGS. 28(*a*) to 28(*d*) are diagrams illustrating the aperture ratios of the plurality of cells CE of the first panel WB corresponding to the input image data IM by gray scale shadings. In FIGS. 28(*a*) to 28(*d*), the gray scale shading means that the darker the cell CE is, the smaller the aperture ratio is, and the lighter the cell CE is, the larger the aperture ratio is. In FIGS. 28(*a*) to 28(*d*), the high luminance region BA is also drawn to overlap the cells CE. In FIGS. 28(*a*) to 28(*d*), the high luminance region BA is drawn in black for clarity. From FIG. 28A to FIG. 28D, the position of the high luminance region BA moves in the right direction. As illustrated in FIGS. 28(*a*) to 28D, according to the image processing device 10 of the present embodiment, as in the image processing device 10 of the first embodiment, when the high luminance region BA moves in a region in the cell CE, the aperture ratios of the cells CE located in a periphery of the high luminance region BA change accordingly. Further, when the high luminance region BA moves across the plurality of cells CE, the aperture ratio of each cell CE also changes. As described above, according to the image processing device 10 of the present embodiment, the aperture ratio of each cell CE continuously changes both when the high luminance region BA in the input image data IM moves within a certain cell CE and when it moves across the plurality of cells CE. Thus, flicker can be suppressed.

Figure 29:
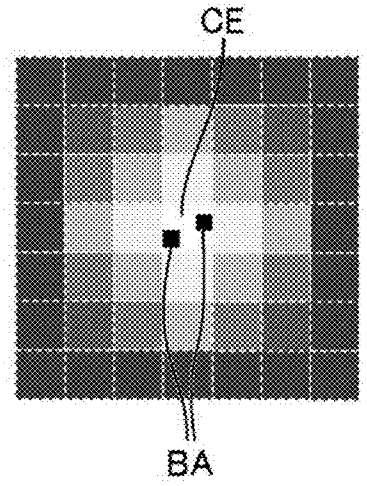
FIG. 29 is a diagram illustrating an example of the input image data displayed by the display device according to the second embodiment and aperture ratio of the cells of the first panel.

FIG. 29 is a diagram illustrating an example of the input image data IM displayed by the display device 1 according to the present embodiment and aperture ratios of the cells CE of the first panel WB. FIG. 29 illustrates a situation in which the plurality of high luminance regions BA are present in a region in one cell CE.

As illustrated in FIG. 29, in the image processing device 10 of the present embodiment, even when the plurality of high luminance regions BA are present in the region in one cell CE, the luminance of the peripheral cells CE is determined without being affected by the plurality of high luminance regions BA. In the image processing device 10 according to the present embodiment, when the plurality of high luminance regions BA are present in the region in one cell CE, one luminance center of gravity LC reflecting the influence of the luminance of the plurality of high luminance regions BA is calculated. As can be seen from FIG. 29, when the luminance center of gravity LC is present at the center position of the center cell CE, the display of the image processing device 10 of the present embodiment is different from the display of the image processing device 10 of the first embodiment.

Third Embodiment

The image processing device 10 according to a third embodiment will be described with reference to FIGS. 30 to 32. Note that description of points similar to those in the image processing device 10 of the first or second embodiment will not be repeated below. The image processing device 10 of the present embodiment is different from the image processing device 10 of the first or second embodiment in the following respects.

Figure 30:
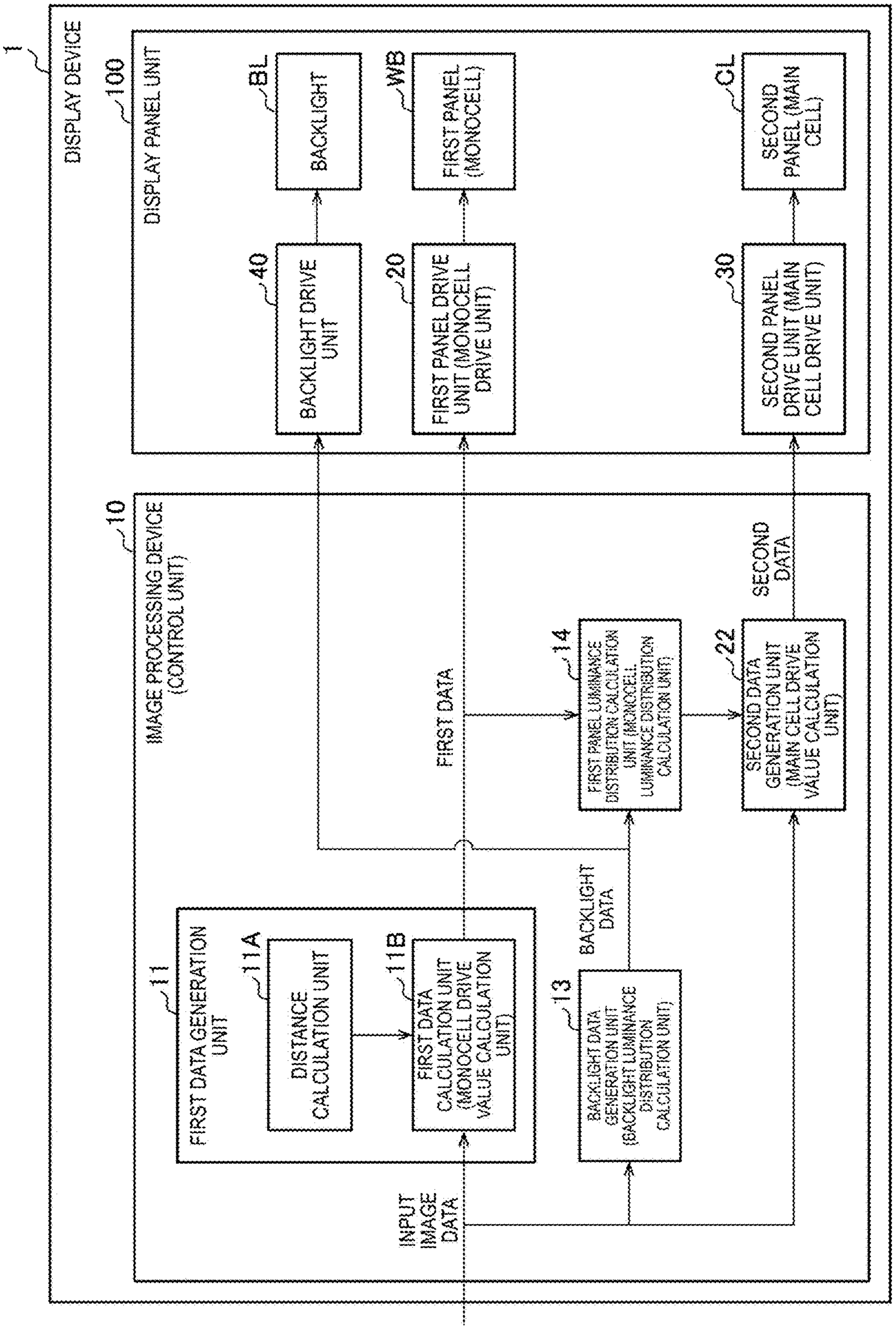
FIG. 30 is a block diagram illustrating an overall configuration of a display device according to a third embodiment.

FIG. 30 is a block diagram illustrating an overall configuration of the display device 1 according to the present embodiment.

In the present embodiment, the backlight BL includes the plurality of light-emitting regions LER capable of independently adjusting a light emission amount of each of the plurality of light-emitting regions LER. That is, in the present embodiment, the image processing device 10 performs the local dimming. The image processing device 10 of the present embodiment includes a backlight data generation unit 13 and a first panel luminance distribution calculation unit 14. The image processing device 10 of the present embodiment includes a second data generation unit 22 instead of the second data generation unit 12.

The backlight data generation unit 13 generates the backlight data for controlling the respective light emission amounts of the plurality of light-emitting regions LER based on the input image data. The first panel luminance distribution calculation unit 14 calculates the luminance distribution (monocell luminance distribution data) at the position of the second panel CL with respect to light traveling from the first panel WB to the second panel CL based on the backlight data and the first data. The second data generation unit 22 generates second data based on the input image data and the monocell luminance distribution data.

Unlike the image processing device 10 of the first and second embodiments, the image processing device 10 of the present embodiment generates the backlight data for controlling the output of the plurality of light-emitting regions LER based on the input image data. Backlight data is data corresponding to a resolution of 6×4. The backlight data generation unit 13 generates, from the input image data, a value of the output of each of the plurality of light-emitting regions LER constituting the backlight BL (e.g., a lighting rate=actual luminance value/maximum luminance value).

The backlight data generation unit (backlight luminance distribution calculation unit) 13 acquires, as an example, a representative value of the input gray scale values of several picture elements PE, that is, several subpixels, included in one virtual region facing one light-emitting region LER. The representative value is, for example, the maximum value, the average value, the median value, the value of 80% of the maximum value, or the like of the input gray scale values of the several picture elements PE included in one virtual region facing one certain light-emitting region LER.

Thereafter, the backlight data generation unit 13 generates, as the value of the output of the one certain light-emitting region LER, a value obtained by dividing the representative value of the input gray scale values of the several picture elements PE in the one virtual region by the upper limit value of the input gray scale values. The upper limit value of the input gray scale values refers to a maximum value of the input gray scale values. The backlight data generation unit 13 outputs the value of the output of each light-emitting region LER obtained in this way as data (backlight data) for controlling the backlight. The backlight drive unit 40 controls the output of each light-emitting region LER of the backlight BL according to the backlight data.

The first panel luminance distribution calculation unit (monocell luminance distribution calculation unit) 14 calculates the monocell luminance distribution data by using the backlight data and the first data. The monocell luminance distribution data is a luminance distribution at the position of the second panel CL with respect to light emitted from each light-emitting region LER of the backlight BL, passing through each cell CE of the first panel, and traveling toward each picture element PE of the second panel CL. The first panel luminance distribution calculation unit 14 may calculate the monocell luminance distribution data by using a point spread function (PSF) for calculating the distribution of the luminance of light traveling from the light-emitting regions LER included in the backlight BL to the cells CE included in the first panel WB. The first panel luminance distribution calculation unit 14 may calculate the monocell luminance distribution data by using a point spread function (PSF) for calculating the distribution of the luminance of light traveling from the cells CE included in the first panel WB to the picture elements PE included in the second panel CL.

The second data generation unit (main cell drive value calculation unit) 22 generates the second data for controlling the aperture ratios of the plurality of picture elements PE by correcting the input image data based on the input image data and the monocell luminance distribution data. The second data is generated so as to compensate for the lack of luminance caused by adjusting the amount of light traveling from the backlight BL to each picture element PE by controlling the light emission luminance of each light-emitting region LER of the backlight BL and controlling the aperture ratio of each cell CE of the first panel. Thereafter, the second data generation unit 12 transmits the second data to the second panel drive unit 30.

Note that in the first embodiment, the second data generation unit 12 also generates monocell luminance distribution data. On the other hand, in the present embodiment, it is necessary to use the backlight data in addition to the first data in order to calculate the monocell luminance distribution data. Thus, the image processing device 10 of the present embodiment includes the first panel luminance distribution calculation unit 14 in addition to the second data generation unit 22. However, the configuration of the processing execution portion in the image processing device 10 can be appropriately selected. For example, the image processing device 10 of the present embodiment the second data generation unit 12 may generate the monocell luminance distribution data without including the first panel luminance distribution calculation unit 14. Conversely, the image processing device 10 of the first embodiment may include a processing unit for calculating the monocell luminance distribution data separately from the second data generation unit 12.

Figure 31:
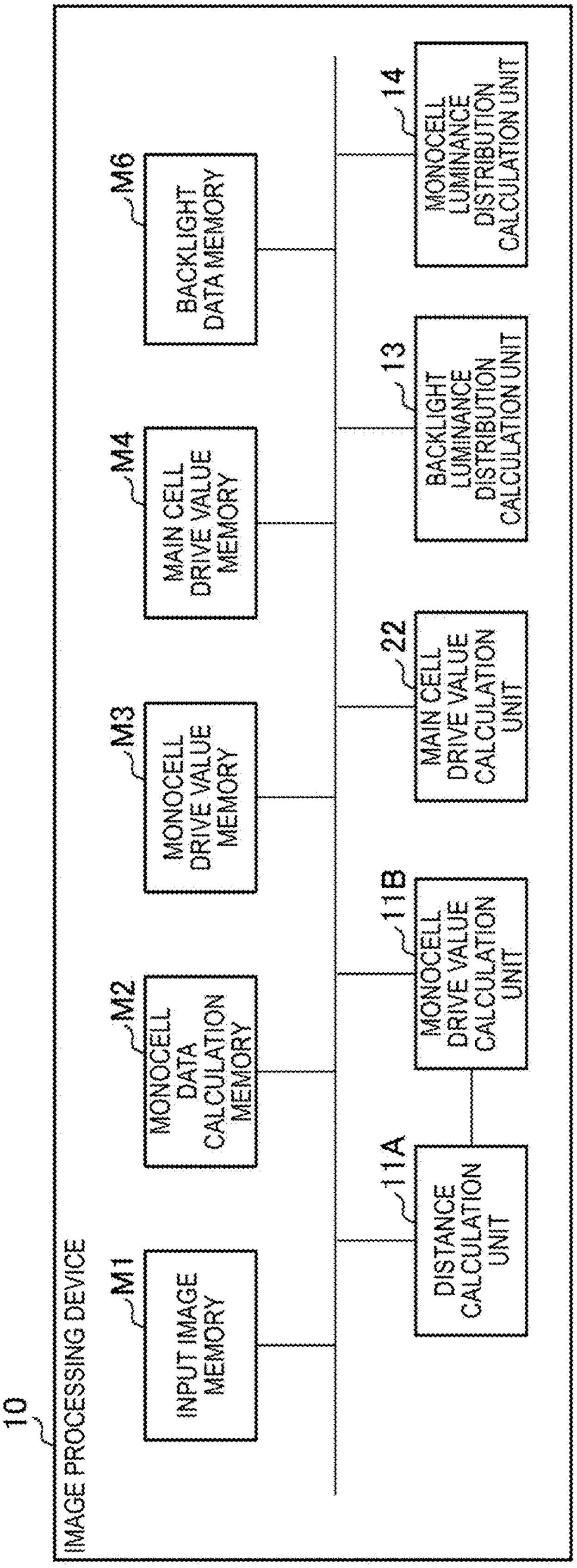
FIG. 31 is a diagram specifically illustrating an internal configuration of the image processing device according to the third embodiment.

FIG. 31 is a diagram specifically illustrating an internal configuration of the image processing device 10 according to the present embodiment.

As illustrated in FIG. 31, the image processing device 10 of the present embodiment includes a backlight data memory M6, the backlight data generation unit (backlight luminance distribution calculation unit) 13, and the first panel luminance distribution calculation unit (monocell luminance distribution calculation unit) 14. The image processing device 10 of the present embodiment includes the second data generation unit 22 instead of the second data generation unit 12. In these respects, the image processing device 10 of the present embodiment is different from the image processing device 10 of the first or second embodiment.

Figure 32:
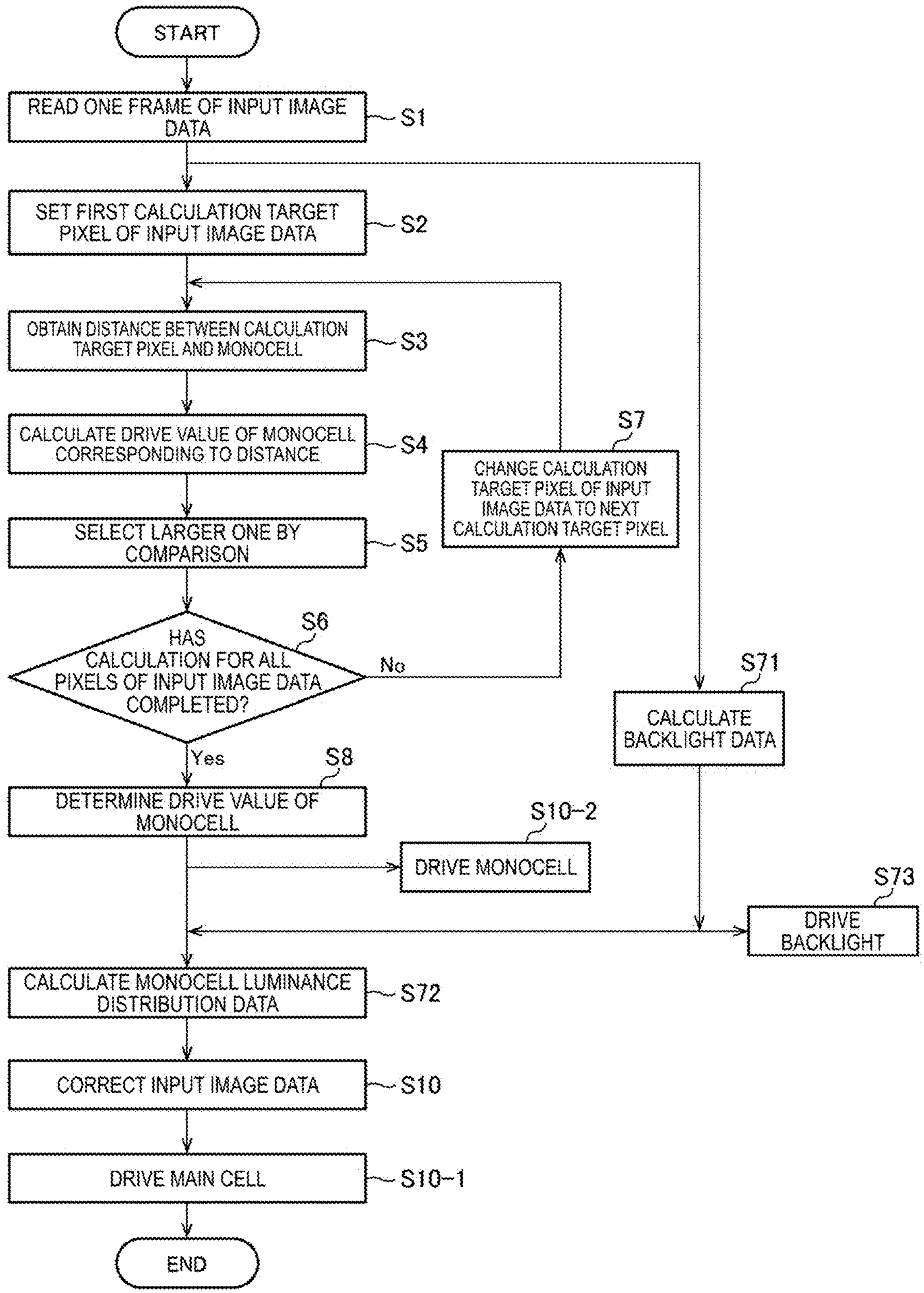
FIG. 32 is a flowchart for describing processing executed by the image processing device according to the third embodiment.

FIG. 32 is a flowchart for describing processing executed by the image processing device 10 according to the present embodiment.

As shown in FIG. 32, the image processing device 10 of the present embodiment is different from the image processing devices 10 of the first and second embodiments in that steps S71 to S73 are included.

In step S71, the backlight data generation unit (backlight luminance distribution calculation unit) 13 calculates a backlight data, which is control data for each light-emitting region LER of the backlight BL, based on the input image data read in step S1. In step S72, the first panel luminance distribution calculation unit (monocell luminance distribution calculation unit) 14 calculates the monocell luminance distribution data. In step S73, the backlight drive unit 40 drives the backlight BL based on the backlight data calculated in step S71.

As in the image processing device 10 of the present embodiment, even when the backlight BL performs local dimming, the same effects as those obtained by the image processing devices 10 of other embodiments can be obtained. That is, the aperture ratio of each cell CE continuously changes both when the high luminance region BA in the input image data IM moves within a certain cell CE and when it moves across the plurality of cells CE. Thus, flicker can be suppressed.

Fourth Embodiment

The image processing device according to a fourth embodiment will be described with reference to FIG. 33. Note that description of points similar to those in the image processing device of the first to third embodiments will not be repeated below. The image processing device of the present embodiment is different from the image processing device of the first to third embodiments in the following respects.

Figure 33:
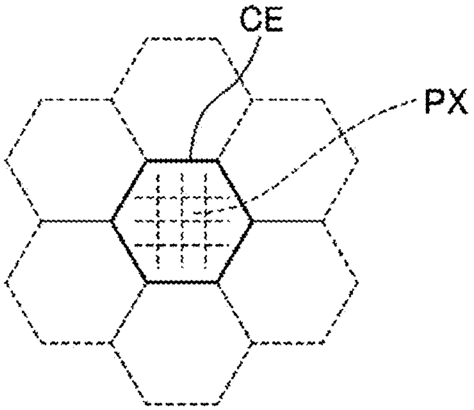
FIG. 33 is a diagram illustrating cells of a display device according to a fourth embodiment.

FIG. 33 is a diagram illustrating cells CE of the display device 1 according to the fourth embodiment.

As illustrated in FIG. 33, in a front view of the display panel unit 100 of the display device 1 of the present embodiment, a shape of each of the first cell CE and the plurality of second cells CE is different from a shape of each of the plurality of first pixels PX and the plurality of second pixels PX. For example, when the shape of each of the plurality of pixels PX in a front view is a rectangle or a square, the shape of the cell CE may be a hexagon or a mixture of an octagon and a quadrangle. Even with the image processing device 10 of the display device 1 of the present embodiment, the same effects as those obtained by the image processing devices 10 of the display device 1 of the first to third embodiments can be obtained.

Fifth Embodiment

The image processing device according to a fifth embodiment will be described with reference to FIGS. 34 and 35. Note that description of points similar to those in the image processing device of the first to fourth embodiments will not be repeated below. The image processing device of the present embodiment is different from the image processing device of the first to fourth embodiments in the following respects.

Figure 34:
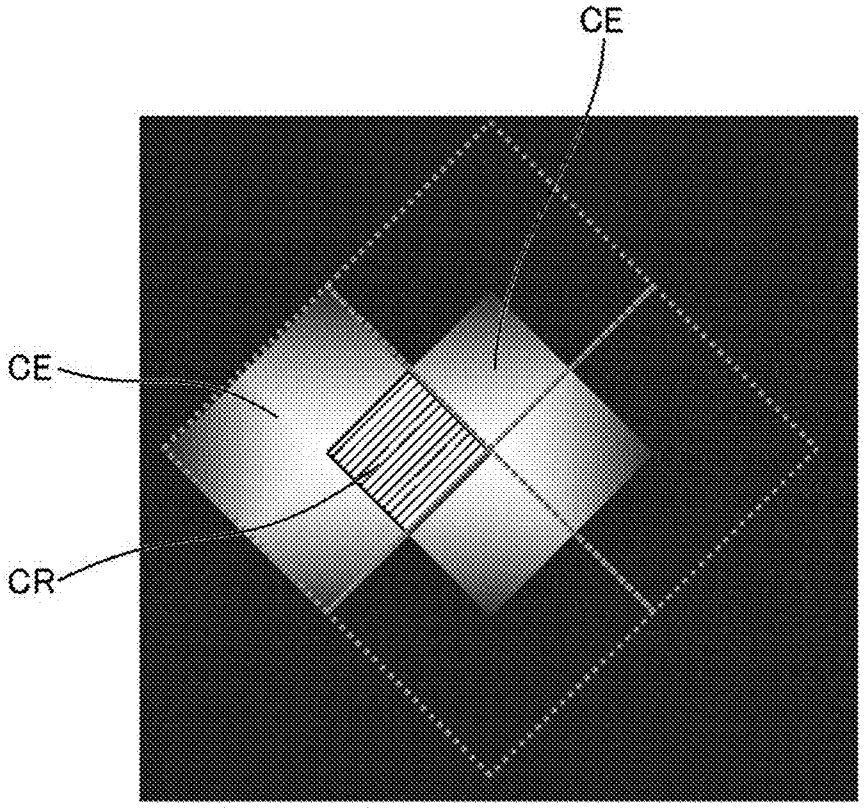
FIG. 34 is a diagram illustrating cells of a display device according to a fifth embodiment.

FIG. 34 is a diagram illustrating cells CE of the display device 1 according to the present embodiment.

As illustrated in FIG. 34, in a front view of the display panel unit 100 of the display device 1 of the present embodiment, a part of one cell CE of the first cell and the plurality of second cells CE and a part of an adjacent cell CE adjacent to the one cell CE are mixed in a common region CR. Even with the image processing device 10 of the display device 1 of the present embodiment, the same effects as those obtained by the image processing devices 10 of the display device 1 of the first to fourth embodiments can be obtained.

Figure 35:
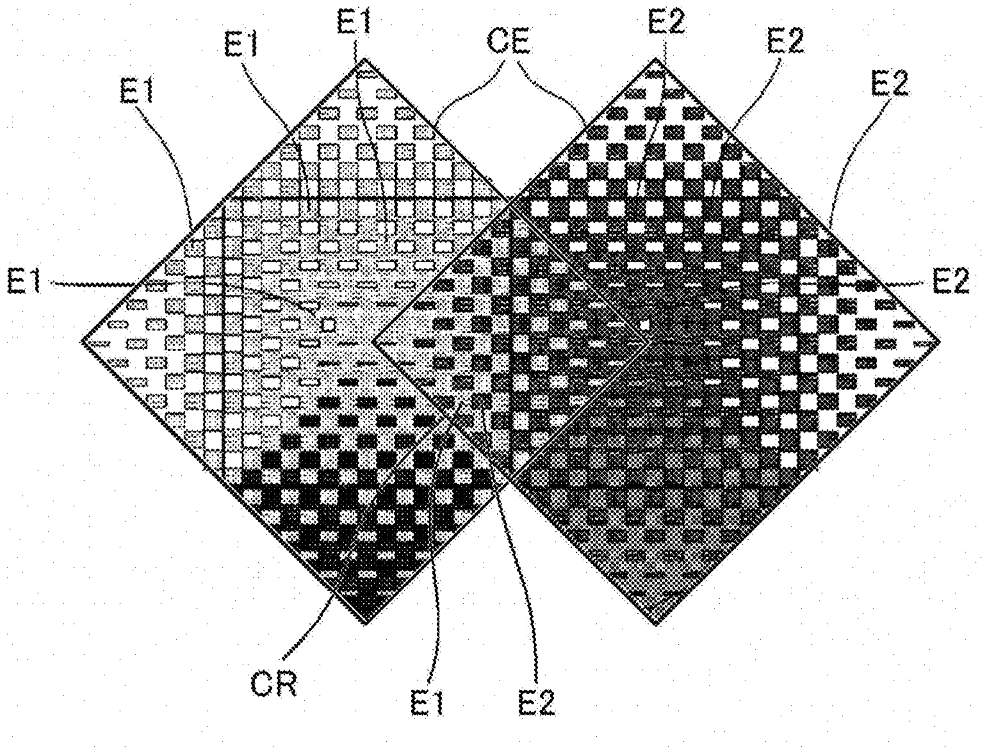
FIG. 35 is a diagram illustrating a specific example of the cells of the display device according to the fifth embodiment.

FIG. 35 is a diagram illustrating a specific example of the cell CE of the display device 1 according to the present embodiment.

As illustrated in FIG. 35, the adjacent cells CE include the common region CR. In the common region CR, first electrodes E1 of the first cell CE and second electrodes E2 of the second cell CE are mixed.

The luminance of one common region CR where two adjacent cells CE overlap each other is changed by a combination of the controls of the transmittances of the two adjacent cells CE. Details of this configuration and control are disclosed in US2021/0304686.

Even with the display device 1 in which the plurality of cells CE having such a relationship are employed, the same effect as that obtained by the display device 1 of the above-described first to fourth embodiments can be obtained.

The image processing device and the control method of the image processing device of each of the above-described embodiments may be combined as long as they do not contradict each other. For example, the processing using the plurality of monocell data calculation line memories described as the second example of the image processing device 10 of the first embodiment may be combined with the image processing device described as the third or fourth embodiment. The image processing device 10 and the image processing method of other embodiments may be combined with each other as long as they do not contradict each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image processing device for displaying an image on a display panel unit, the display panel unit including:

a backlight, a first panel facing the backlight and capable of controlling a transmission amount of light at a first resolution, and a second panel facing the first panel and capable of controlling a transmission amount of light at a second resolution higher than the first resolution, the first panel including a first cell and a plurality of second cells surrounding the first cell, and the second panel including a plurality of first pixels at positions facing the first cell, and a plurality of second pixels at positions facing the plurality of second cells, the image processing device comprising:

a first data generation circuit configured to generate first data configured to control the first panel based on input image data; and a second data generation circuit configured to generate second data configured to control the second panel based on the input image data and the first data, wherein the first data generation circuit generates the first data for the first cell based on:

input luminance of the plurality of first pixels specified by the input image data and input luminance and positions of the plurality of second pixels specified by the input image data, and a distance between a predetermined position inside the first cell and a specific position inside each of the plurality of second pixels and the input luminance of the plurality of second pixels, and wherein the first data generation circuit generates the first data such that a degree of influence of input luminance of a second pixel having a relatively large distance among the plurality of second pixels on a luminance of the first cell is smaller than a degree of influence of input luminance of a second pixel having a relatively small distance among the plurality of second pixels on the luminance of the first cell.

2. The image processing device according to claim 1, wherein the first data generation circuit generates the first data such that a degree of influence of input luminance of a second pixel having relatively large input luminance among the plurality of second pixels on the luminance of the first cell is larger than a degree of influence of input luminance of a second pixel having relatively small input luminance among the plurality of second pixels on the luminance of the first cell.

3. The image processing device according to claim 1, wherein the backlight includes a plurality of light-emitting regions capable of adjusting a light emission amount, the image processing device further comprising:

a backlight data generation circuit configured to generate backlight data configured to control the light emission amount of each of the plurality of light-emitting regions based on the input image data; and a first panel luminance distribution calculation circuit configured to calculate a luminance distribution at a position of the second panel with respect to light traveling from the first panel to the second panel based on the backlight data and the first data, and the second data generation circuit generates the second data based on the input image data and the luminance distribution.

4. The image processing device according to claim 1, wherein, in a front view of the display panel unit, a shape of each of the first cell and the plurality of second cells is different from a shape of each of the plurality of first pixels and the plurality of second pixels.

5. The image processing device according to claim 1, wherein, in a front view of the display panel unit, a part of one cell of the first cell and the plurality of second cells and a part of an adjacent cell adjacent to the one cell are mixed in a common region.

6. The image processing device according to claim 1, wherein the first panel is a liquid crystal panel.

7. The image processing device according to claim 1, wherein the second panel is a liquid crystal panel.

8. A display device comprising:
the image processing device according to claim 1; and the display panel unit.

9. An image processing device for displaying an image on a display panel unit, the display panel unit including: a backlight, a first panel facing the backlight and capable of controlling a transmission amount of light at a first resolution, and a second panel facing the first panel and capable of controlling a transmission amount of light at a second resolution higher than the first resolution, the first panel including a first cell and a plurality of second cells surrounding the first cell, and the second panel including a plurality of first pixels at positions facing the first cell and a plurality of second pixels at positions facing the plurality of second cells, the image processing device comprising: a first data generation circuit configured to generate first data configured to control the first panel based on input image data; and a second data generation circuit configured to generate second data configured to control the second panel based on the input image data and the first data, wherein the first data generation circuit generates the first data for the first cell based on input luminance of the plurality of first pixels specified by the input image data and input luminance and positions of the plurality of second pixels specified by the input image data, and wherein the first data generation circuit includes: a representative value setting unit-circuit configured to set a representative value of each of the plurality of second cells based on the input luminance of the plurality of second pixels at the positions facing each of the plurality of second cells, a luminance center of gravity calculation unit-circuit configured to calculate a luminance center of gravity of each of the plurality of second cells based on the input luminance and the positions of the plurality of second pixels, a filter calculation circuit configured to calculate filter coefficients of a two dimensional filter for a plurality of peripheral cells surrounding a center cell and including the first cell when one of the plurality of second cells is set as the center cell based on the luminance center of gravity calculated for each of the plurality of second pixels, and a filter processing unit circuit configured to generate the first data for the first cell by performing filter processing, for each of the plurality of second cells, on the representative value of the plurality of peripheral cells with each second cell as the input luminance of the center cell by using the filter coefficients of the two dimensional filter.

10. The image processing device according to claim 9, wherein the filter calculation circuit is configured to:
calculate the filter coefficients of the two dimensional filter by performing a correction to increase the filter coefficients of the two dimensional filter for the plurality of peripheral cells present on a side of the luminance center of gravity with respect to a representative position of the center cell, and
calculate the filter coefficients of the two dimensional filter by performing a correction to decrease the filter coefficients of the two dimensional filter for the plurality of peripheral cells present on an opposite side of the luminance center of gravity with respect to the representative position of the center cell.

11. The image processing device according to claim 10, wherein the filter calculation circuit is further configured to calculate post-correction filter coefficients of the two dimensional filter by correcting the filter coefficients and a change amount due to the correction of the filter coefficients increases as a distance between the representative position of the center cell and the luminance center of gravity increases.

12. The image processing device according to claim 9, wherein the two dimensional filter is a low pass filter.

13. The image processing device according to claim 9, wherein the backlight includes a plurality of light-emitting regions capable of adjusting a light emission amount,
the image processing device further comprising:
a backlight data generation circuit configured to generate backlight data configured to control the light emission amount of each of the plurality of light-emitting regions based on the input image data; and
a first panel luminance distribution calculation circuit configured to calculate a luminance distribution at a position of the second panel with respect to light traveling from the first panel to the second panel based on the backlight data and the first data, and
the second data generation circuit generates the second data based on the input image data and the luminance distribution.

14. The image processing device according to claim 9, wherein, in a front view of the display panel unit, a shape of each of the first cell and the plurality of second cells is different from a shape of each of the plurality of first pixels and the plurality of second pixels.

15. The image processing device according to claim 9, wherein, in a front view of the display panel unit, a part of one cell of the first cell and the plurality of second cells and a part of an adjacent cell adjacent to the one cell are mixed in a common region.

16. The image processing device according to claim 9, wherein the first panel is a liquid crystal panel.

17. The image processing device according to claim 9, wherein the second panel is a liquid crystal panel.

18. A display device comprising:
the image processing device according to claim 9; and the display panel unit.

* * * * *